US009686595B2

(12) United States Patent
Fabian-Issacs et al.

(10) Patent No.: US 9,686,595 B2
(45) Date of Patent: *Jun. 20, 2017

(54) SYSTEMS AND METHODS FOR PROVIDING AUDIO-BASED GUIDANCE

(71) Applicant: Rovi Guides, Inc., San Carlos, CA (US)

(72) Inventors: Constance Fabian-Issacs, Tulsa, OK (US); Charles B. Ammann, Tulsa, OK (US); Toby DeWeese, Tulsa, OK (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/087,634

(22) Filed: Mar. 31, 2016

(65) Prior Publication Data

US 2016/0323655 A1    Nov. 3, 2016

Related U.S. Application Data

(63) Continuation of application No. 14/573,448, filed on Dec. 17, 2014, which is a continuation of application
(Continued)

(51) Int. Cl.
*H04N 5/445* (2011.01)
*H04N 21/81* (2011.01)
(Continued)

(52) U.S. Cl.
CPC ..... *H04N 21/8106* (2013.01); *H04N 21/4221* (2013.01); *H04N 21/42207* (2013.01); *H04N 21/42222* (2013.01); *H04N 21/439* (2013.01); *H04N 21/4415* (2013.01); *H04N 21/4622* (2013.01); *H04N 21/4722* (2013.01); *H04N 21/482* (2013.01); *H04N 21/488* (2013.01); *H04N 21/4821* (2013.01); *H04N 21/4825* (2013.01); *H04N 2005/44556* (2013.01)

(58) Field of Classification Search
CPC ........... H04N 21/8106; H04N 21/8133; H04N 21/84; H04N 21/43; H04N 21/4722; H04N 21/482
USPC ........................................ 725/40, 47, 52, 53
See application file for complete search history.

(56) References Cited

U.S. PATENT DOCUMENTS

| 5,565,997 | A | * | 10/1996 | Terry | .................. | H04N 5/9208 348/468 |
| 5,677,739 | A | * | 10/1997 | Kirkland | .............. | G09B 21/006 348/468 |

(Continued)

FOREIGN PATENT DOCUMENTS

WO    WO 9945701 A1 *   9/1999   ......... H04N 5/44543

Primary Examiner — James R Sheleheda
(74) Attorney, Agent, or Firm — Ropes & Gray LLP

(57) ABSTRACT

Systems and methods for providing audio-based guidance features are provided. A guidance application may provide listings displays having listings for audio-friendly content. The listings may be indicated as listings for audio-friendly content. The guidance application may provide displays dedicated to listings for audio-friendly content. The guidance application provides audio-prompts describing display screens. The guidance application may determine a user's identity from a voice command and provide personalized guidance features.

44 Claims, 26 Drawing Sheets

Related U.S. Application Data

No. 13/191,621, filed on Jul. 27, 2011, now Pat. No. 8,949,902, which is a continuation of application No. 10/068,508, filed on Feb. 5, 2002, now abandoned.

(60) Provisional application No. 60/266,734, filed on Feb. 6, 2001.

(51) Int. Cl.
*H04N 21/482* (2011.01)
*H04N 21/422* (2011.01)
*H04N 21/4415* (2011.01)
*H04N 21/462* (2011.01)
*H04N 21/439* (2011.01)
*H04N 21/4722* (2011.01)
*H04N 21/488* (2011.01)

(56) References Cited

U.S. PATENT DOCUMENTS

| | | | | |
|---|---|---|---|---|
| 5,699,107 A | * | 12/1997 | Lawler | H04N 5/44543 348/E5.105 |
| 5,699,125 A | * | 12/1997 | Rzeszewski | H04N 5/44543 348/565 |
| 5,737,030 A | * | 4/1998 | Hong | H04N 5/4401 348/553 |
| 5,822,123 A | * | 10/1998 | Davis | A63F 13/12 348/569 |
| 5,850,218 A | * | 12/1998 | LaJoie | H04N 21/84 348/E5.102 |
| 5,896,129 A | * | 4/1999 | Murphy | H04N 5/44543 348/E5.105 |
| 5,900,908 A | * | 5/1999 | Kirkland | G09B 21/006 348/461 |
| 6,177,931 B1 | * | 1/2001 | Alexander | G06Q 30/0269 348/565 |
| 6,594,825 B1 | * | 7/2003 | Goldschmidt Iki | H04N 5/44543 348/E5.005 |
| 6,721,954 B1 | * | 4/2004 | Nickum | H04N 5/44543 348/E5.097 |
| 6,766,524 B1 | * | 7/2004 | Matheny | G06Q 30/0226 348/E7.07 |
| 6,772,433 B1 | * | 8/2004 | LaJoie | H04N 21/84 348/E5.102 |
| 6,792,615 B1 | * | 9/2004 | Rowe | G11B 27/031 348/E5.108 |
| 6,990,679 B2 | * | 1/2006 | Curreri | H04N 5/44543 348/E5.105 |
| 7,051,360 B1 | * | 5/2006 | Ellis | H04N 5/44543 348/461 |
| 7,240,356 B2 | * | 7/2007 | Iki | H04N 5/44543 348/E5.005 |
| 7,483,834 B2 | * | 1/2009 | Naimpally | G10L 13/00 704/258 |
| 7,769,589 B2 | * | 8/2010 | Lee | H04N 5/445 704/258 |
| 7,926,078 B2 | * | 4/2011 | Arsenault | H04N 7/17336 725/101 |
| 8,949,902 B1 | * | 2/2015 | Fabian-Isaacs | H04N 21/439 725/40 |
| 2001/0054183 A1 | * | 12/2001 | Curreri | H04N 5/44543 725/56 |
| 2002/0100054 A1 | * | 7/2002 | Feinberg | H04N 5/44582 725/107 |
| 2003/0023969 A1 | * | 1/2003 | Jeong | H04N 7/163 725/28 |
| 2003/0050784 A1 | * | 3/2003 | Hoffberg | G06F 17/30743 704/270.1 |
| 2003/0088613 A1 | * | 5/2003 | Goldschmidt Iki | H04N 5/44543 709/202 |
| 2003/0093790 A1 | * | 5/2003 | Logan | G06F 17/30265 725/38 |
| 2003/0105639 A1 | * | 6/2003 | Naimpally | G10L 13/00 704/276 |
| 2003/0145940 A1 | * | 8/2003 | Chaudhury | C09J 5/02 156/272.6 |
| 2012/0054796 A1 | * | 3/2012 | Gagnon | H04N 5/602 725/40 |
| 2013/0007808 A1 | * | 1/2013 | Ellis | H04N 5/44543 725/46 |
| 2013/0133003 A1 | * | 5/2013 | Goldschmidt Iki | H04N 5/44543 725/40 |
| 2015/0106854 A1 | * | 4/2015 | Fabian-Isaacs | H04N 21/439 725/52 |
| 2016/0112736 A1 | * | 4/2016 | Ellis | H04H 60/31 725/14 |

* cited by examiner

SYSTEMS AND METHODS FOR PROVIDING AUDIO-BASED GUIDANCE

This application is a continuation of U.S. patent application Ser. No. 14/573,448, filed on Dec. 17, 2014, which is a continuation of U.S. patent application Ser. No. 13/191,621, filed on Jul. 27, 2011, now U.S. Pat. No. 8,949,902, issued Feb. 3, 2015, which is a continuation of U.S. patent application Ser. No. 10/068,508, filed on Feb. 5, 2002, now abandoned, which claims the benefit of U.S. Provisional Patent Application No. 60/266,734, filed Feb. 6, 2001. These prior applications are hereby incorporated by reference herewith in their entireties.

BACKGROUND OF THE INVENTION

This invention relates to electronic program guides and other guidance applications and more particularly, to systems and methods for providing audio-based guidance features in electronic program guides and other guidance applications.

Electronic television program guides such as passive, interactive, and hybrid passive-interactive electronic television program guides are widely available. Typically, these guides present information relating to television programs on display screens. Passive electronic television program guides, for example, display listings information in a display that may be continuously scrolled or periodically changed. Interactive and hybrid passive-interactive electronic television program guides, for example, allow users to indicate and select program listings, and to access other program guide features, within display screens. To take full advantage of such electronic television program guides, users must be able to read and understand the information and prompts presented in the displays. This may be difficult or impossible for those who are visually impaired or who cannot understand the language in which information is displayed.

Previously known program guides also do not provide information regarding the amount or type of audio information available in programs. For example, programs are being distributed by networks such as the Narrative Television Network, that are narrated in a second audio track. Providing an indication of such audio-friendly programs may be extremely helpful to some users of guides.

Another possible drawback of previously known interactive electronic television program guides relates to the way these guides support multiple users. Supporting multiple users using only visually-oriented login procedures may be impracticable in households with one or more visually impaired users.

Accordingly, it is desirable to provide electronic program guides that provide increased support for users who may have difficulty with or cannot obtain guidance from typical visually-oriented guides.

SUMMARY OF THE INVENTION

The present invention provides systems and methods for providing audio-based guidance features in electronic program guides, such as passive, interactive, and hybrid passive-interactive television program guides, and other types of guidance applications (e.g., guidance applications for non-television-based content). Various features and embodiments of the present invention are described, for example, in U.S. provisional application No. 60/266,734, filed Feb. 6, 2001, which is hereby incorporated by reference herein in its entirety.

In some embodiments, indicators may be provided to indicate audio-friendly content to users. Audio-friendly content may include, for example, television-based programs (e.g., television programs, pay-per-view programs, on-demand programs, or other programs suitable for television viewing), Internet-delivered content (e.g., web sites), software applications, or any other interactive or passive content having audio-characteristics which make such content desirable to users who have difficulties viewing or understanding the visual portion of such content. Audio-friendly television-based programs, for example, may have associated audio tracks that contain supplemental audio information that describes the visual portion of the programs (e.g., narration tracks). Audio-friendly Internet-delivered content and software applications, for example, may contain or provide audio clips or streams in addition to or instead of visual content, to describe to the user what is being displayed on the screen. Other interactive or passive content may have audio-characteristics such as, for example, tone indicators that indicate various visual options, categories, listings, or any other suitable visual content to the user.

In embodiments based on electronic television program guides, guidance may be provided exclusively for television-based programs. Some embodiments may also provide guidance for other types of content, in addition to television-based programs (e.g., Internet-delivered content, software applications, etc.). Listings of audio-friendly content may be provided. In some embodiments, displays that include listings may be dedicated to listings for audio-friendly content. In other embodiments, displays may include listings for both audio-friendly and regular content. In such displays, the display characteristics of listings for audio-friendly content may be different from that of listings for regular content (e.g., the color, font, font-size, or other display characteristics). For example, listings may have visual indicators indicating that associated content is audio-friendly. As another example, tone indicators (e.g., beeping sounds) may be provided to the user in conjunction with visual indicators to indicate listings for audio-friendly content (e.g., in response to a user navigates to a listing).

Other guidance features may also be provided for audio-friendly content. In embodiments for interactive and hybrid electronic television program guides, for example, reminders may be scheduled for audio-friendly content, audio-friendly content (or their sources) may be saved as favorites, and audio-friendly programs may be scheduled for recording.

Some embodiments of the present invention may audibly output all or portions of displayed information to enable users to obtain audible information about what is being displayed on screen. Displayed information that may be read to users may include, for example, guidance information associated with electronic program guides (e.g., flip information, browse information, listings information, prompts, menus, advertisements, promotions, ordering information, setup instructions, or any other non-guide application options), information associated with Internet-delivered content (e.g., from web-sites), information associated with other non-guide applications, or any other suitable information. Some embodiments may allow the user to control the speed with which information is read to the user. For example, a visually impaired user capable of "speed listening" may be provided with audio information read at a much faster speed than information read to a user with normal listening skills. In some embodiments, audio indicators (e.g., "audio friendly") may be provided to indicate audio-friendly content to the user.

Some embodiments for interactive and hybrid electronic television program guides may provide speech interfaces to enable users to speak voice commands in response to audio prompts. An appropriate input device, such as a wired or wireless microphone, and a suitable voice recognition system may be used to receive and process voice commands from users. Guidance activities such as program selection, browsing, obtaining program information, or any other suitable guidance activity may be performed based on user voice commands. For example, a user may speak voice command "info" in response to an audio prompt reading a listing to the user from a listings display of an interactive electronic television program guide. The guide may subsequently provide additional audio information associated with the listing in response to the user voice command.

Some embodiments of the present invention may personalize guidance features to the user (e.g., customize guide interfaces, audio-friendly indicators, audio prompts, advertisements, parental control, favorites, reminders, or any other suitable feature) based on the user's identity. In these embodiments, the user's identity may be determined using visually-oriented or audio-oriented login procedures. For example, a voice login (e.g., voice input of a user name or a user-specified guide name) may be received from a microphone. A voice recognition system may determine the user's identity, for example, by comparing the voice login to saved voice profiles, or using any other suitable approach. Alternatively, a visually-oriented login (e.g., a user-entered name and password) may be received from a login screen for the user. The user's identity may be determined, for example, by comparing the visual login to saved login information, or using any other suitable approach for user recognition. The identity of the user may be used to retrieve user profile settings to personalize guidance features. User information may include, for example, user preferences for guide features (e.g., audio-friendly indicators, audio prompts, advertisements, favorites, reminders, parental control, or any other suitable feature), purchase codes, purchase histories, user activity information, or any other suitable user information.

Further features of the invention, its nature and various advantages will be made apparent from the accompanying drawings and the following detailed description.

DETAILED DESCRIPTION OF EMBODIMENTS OF THE INVENTION

Figure 1:
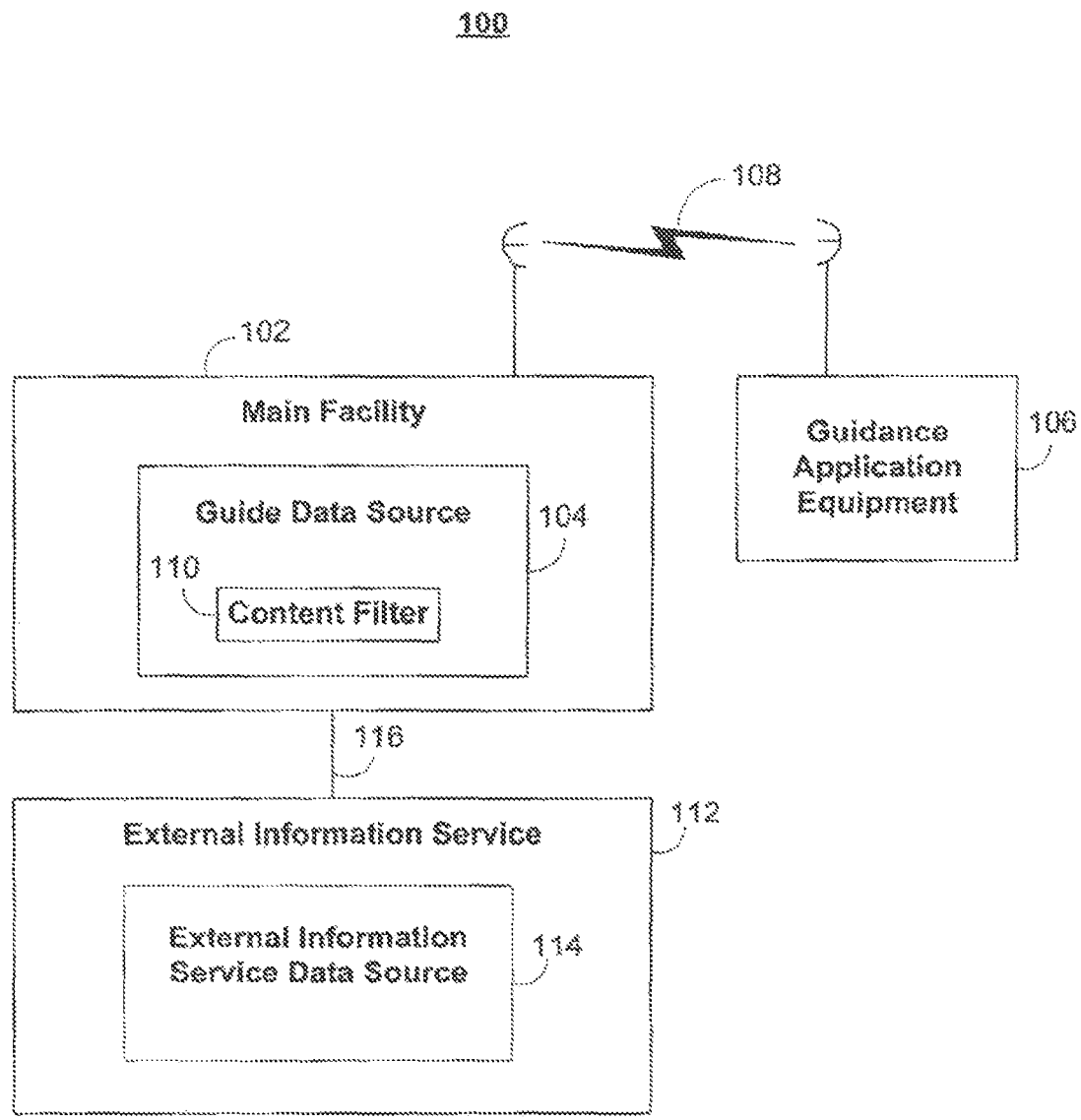
FIG. 1 is a schematic diagram of an illustrative system in accordance with one embodiment of the present invention.

An illustrative guidance application system 100 in accordance with one embodiment of the present invention is shown in FIG. 1. For purposes of clarity, and not by way of limitation, system 100 will be described in the context of an electronic television program guide system. The various features of the present invention, however, may be provided by other types of guidance applications, such as guidance applications for Internet-delivered content (including, for example, web pages), software, or other non-television-based content.

Main facility 102 provides program guide data from guide data source 104 to guidance application equipment 106 over communication link 108. Program guide data may include, for example, television program listings data, program information, pay-per-view ordering information, help text, weather information, sports information, music channel information, associated Internet web links, associated software, or any other suitable information. Guide data source 104 may be any suitable computer or computer-based system for generating, storing or obtaining data (e.g., manually from an operator, electronically via a computer network, storage media, or any other suitable connection), and putting the data into electronic form for distribution by main facility 102. There may be multiple guide data sources 104 although only one has been shown to avoid over-complicating the drawing.

In some embodiments, guide data source 104 may also provide audio-friendly data. Audio-friendly data is data which indicates whether content is audio-friendly (e.g., whether content has audio-characteristics, such as, for example, an audio track that describes the visual portion of such content). For example, content filter 110 may be any suitable combination of hardware and software programmed to identify, or configured to allow an operator to identify, audio-friendly content. For example, content filter 110 may identify audio-friendly television-based programs (e.g., television programs, pay-per-view programs, on-demand programs, or other programs suitable for television viewing) having, for example, associated audio tracks that contain supplemental audio information (e.g., narration tracks) that describe the visual portion of the content. As another example, content filter 110 may identify Internet-delivered audio-friendly content (e.g., web sites), software applications, or any other non-guide applications, that contain or provide, for example, audio clips or streams that describe the visual portion of the content. As another example, content filter 110 may identify audio-friendly content that has associated tone indicators that indicate various visual options, categories, listings, or any other suitable visual portion of the content. As yet another example, content filter 110 may be programmed to allow an operator at main facility 102 to manually identify audio-friendly content. In other approaches, content providers may indicate whether content is audio-friendly, using flags, tone indicators, or descriptive phrases in data associated with the content (e.g., associated metadata).

Some embodiments may include external sources of program guide data, such as external information service data source 114 located at facilities separate from main facility 102, such as external information service 112. External information service 112 may be any local information service suitable for obtaining and transferring content, data or both, from a localized region to main facility 102. External information service 112 may be, for example, a local weather station that measures weather data, a local newspaper that obtains local sports information, or any other suitable provider of information.

External information service 112 may provide content such as text or graphics describing weather conditions, pictures or videos of local sporting events or news objects, or other suitable content from external information service data source 114. External information service data source 114 may be any suitable computer or computer-based system for generating, storing, or obtaining content, data or both, (e.g., manually from an operator, electronically via a computer network, storage media, or any other suitable connection) and putting the content data into electronic form for distribution by main facility 102. Content and data from external information service 112 may be transferred to main facility 102 over link 116. Link 116 may be a satellite link, a telephone network link, a cable or fiber optic link, a microwave link, an Internet link, a combination of such links, or any other suitable communication link.

For example, an operator may receive and store content using external information service data source 114. The operator may also input data for the content, such as a unique identifiers, titles and descriptions. Some content may be audio-friendly. For example, the operator may record audio that describes the content, and may associate the audio with the content (e.g., as a supplemental audio track). The data for such content may include audio-friendly data, such as flags, tone indicators, keywords or descriptions, that indicate the content is audio-friendly.

When main facility 102 receives content and data from external information service 112, content filter 110 may identify the content as being audio-friendly (e.g., by detecting an audio-friendly flag or detecting an associated audio track), and provide such content and data as part of the program guide data to guidance application equipment 106.

Main facility 102 may transmit audio-friendly data and other program guide data to guidance application equipment 106 using any suitable approach or combination of approaches. For example, main facility 102 may distribute audio-friendly data and other program guide data periodically, continuously, or using any other suitable approach. Audio-friendly data and other program guide data may be distributed discretely as separate files or packets, or may be distributed in a continuous data stream (e.g., using a carousel-based approach), in some embodiments, main facility 102 may transmit audio-friendly data separate from other program guide data. The program guide may update previously received program guide data with audio-friendly information. Main facility 102 may also provide audio-friendly data and other program guide data separately using different approaches. For example, audio-friendly data may be transmitted from main facility 102 in a continuous data stream using a carousel-based approach, while other program guide data may be provided periodically using a client-server based approach. Various combinations of approaches may be used in accordance with the present invention.

In some embodiments, the process by which main facility 102 transmits audio-friendly data may depend on the type of content associated with the audio-friendly data. For example, audio-friendly data associated with frequently updated Internet-delivered content (e.g., web sites) may be transmitted to guidance application equipment 106 in a continuous data stream (e.g., using a carousel-based approach) to ensure that listings for audio-friendly content reflect the latest update in the Internet-delivered content.

In some embodiments for passive electronic television program guides, main facility 102 may provide videos to guidance application equipment 106. Videos for passive electronic television program guides may be transmitted in real-time by main facility 102 to guidance application equipment 106 for real-time distribution to viewers' home television equipment. Alternatively, main facility 102 may transmit or otherwise provide (e.g. on portable storage media) videos to guidance application equipment 106 for storage, and subsequent distribution. Numerous installations of guidance application equipment 106 may be desired, although only one is shown in FIG. 1 to avoid over-complicating the drawing.

An electronic program guide may be implemented on guidance application equipment 106. Various illustrative arrangements for guidance application equipment 106 in accordance with various embodiments of the present invention are shown in FIGS. 2-7. For purposes of illustration, the arrangements of FIGS. 2-7 will be described as supporting passive, interactive and hybrid program guides. In practice, various components described for guidance application equipment 106 may not be used, and others may be added, to support one or more of these types of electronic television programming guides or other guidance applications.

Figure 2:
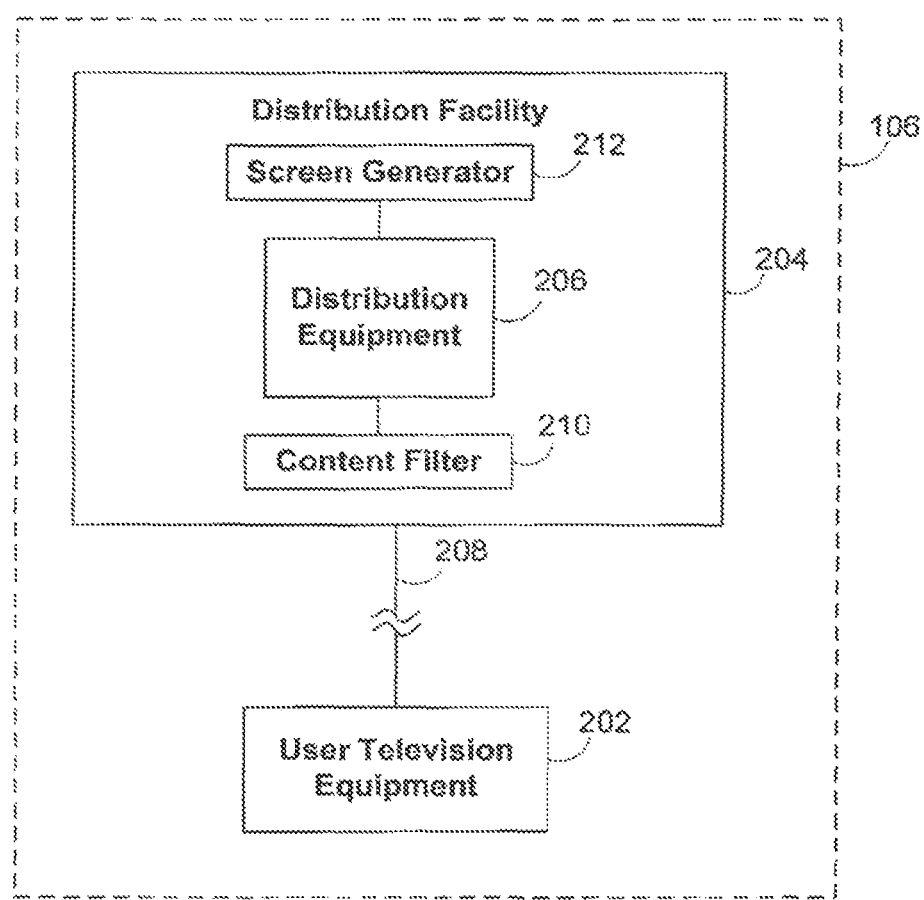
FIGS. 2-7 are schematic diagrams of illustrative arrangements for the guidance application equipment of FIG. 1 in accordance with various embodiments of the present invention.
Figure 3:
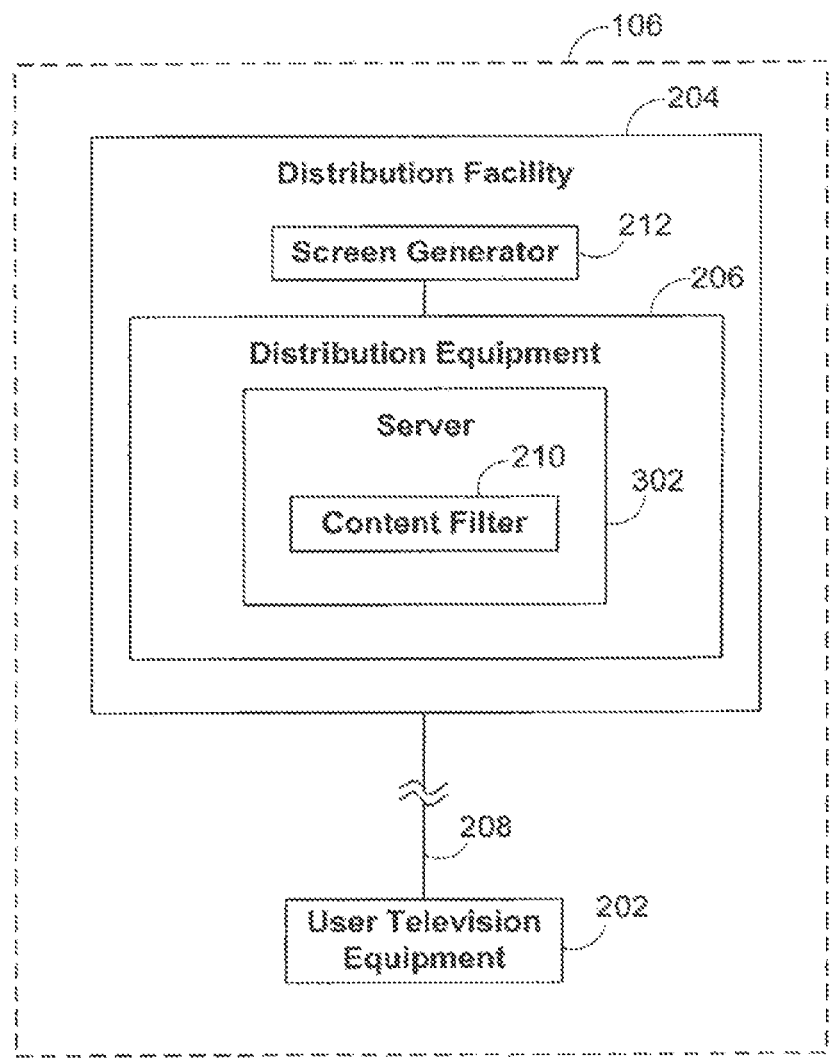
Figure 4:
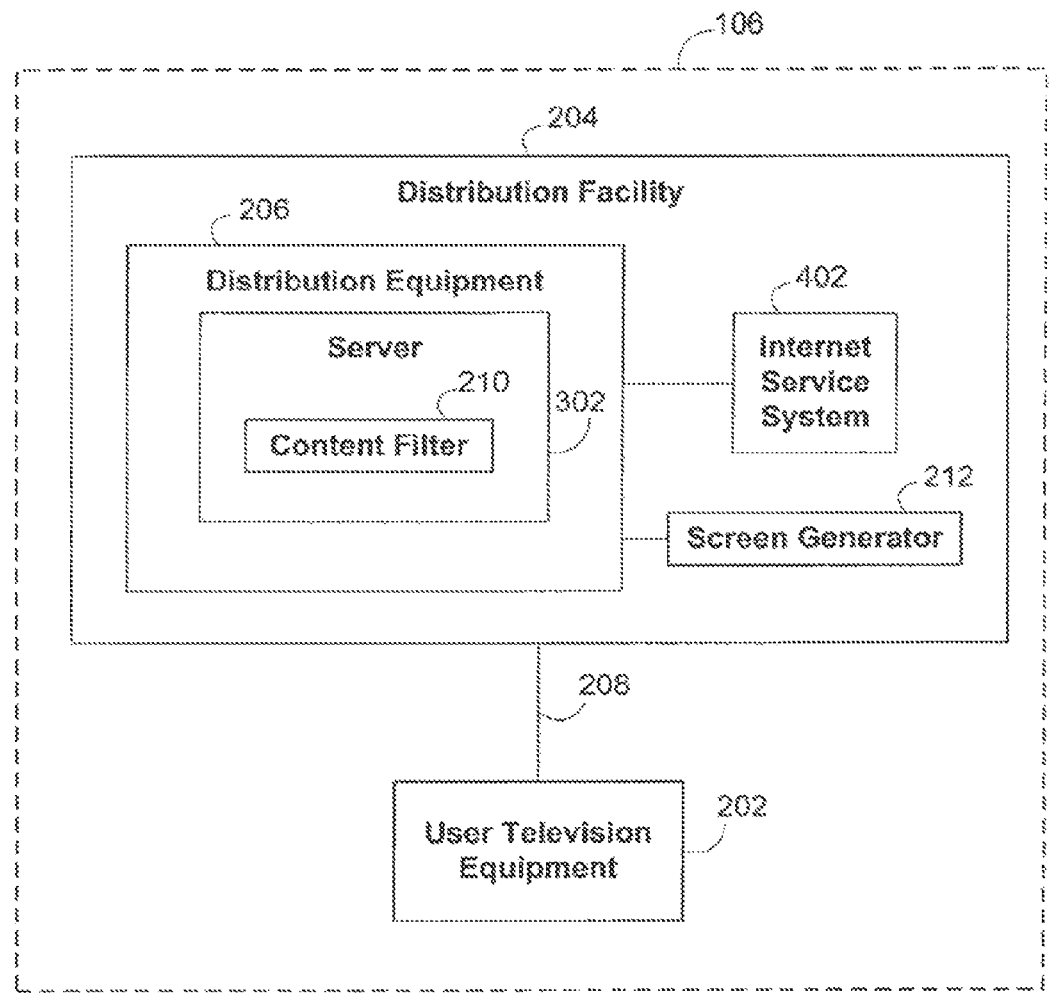
Figure 5:
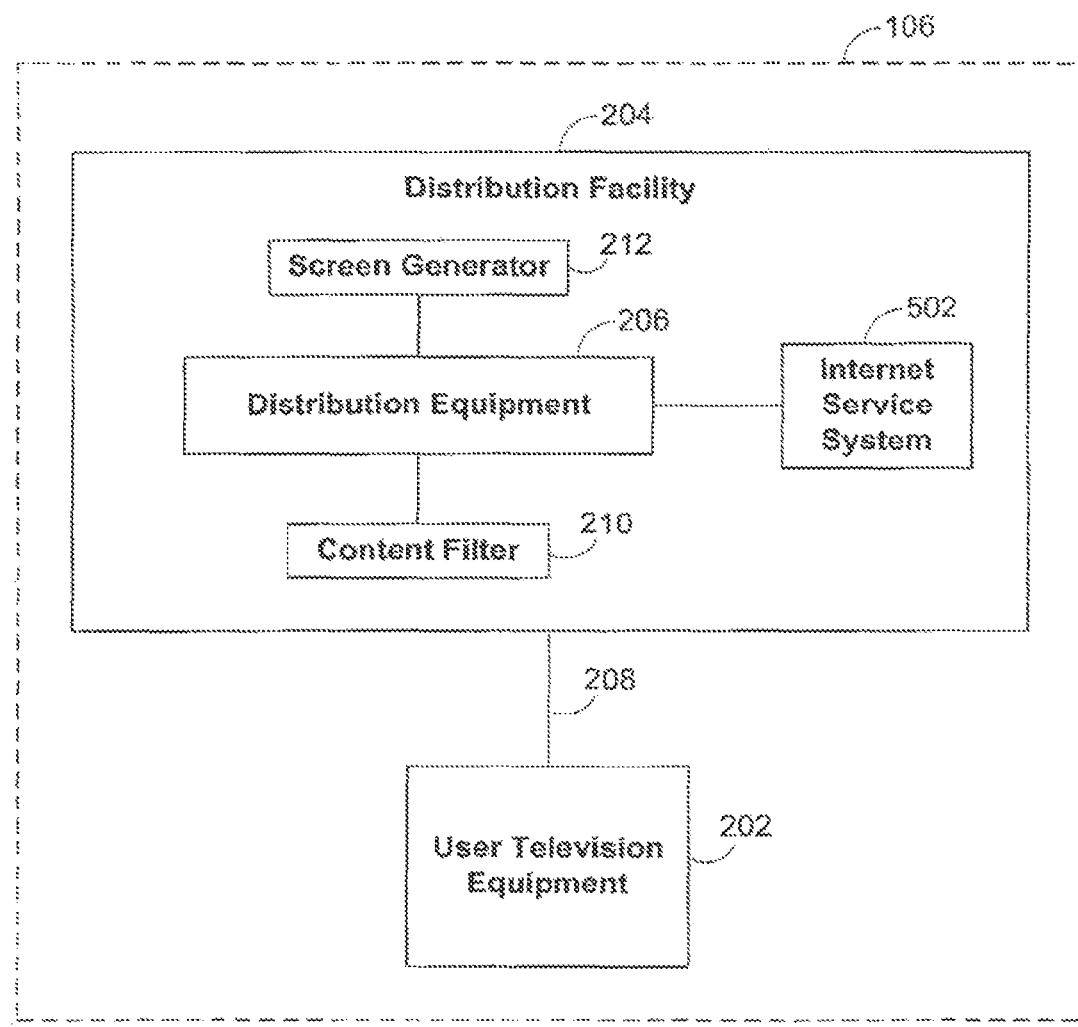
Figure 6:
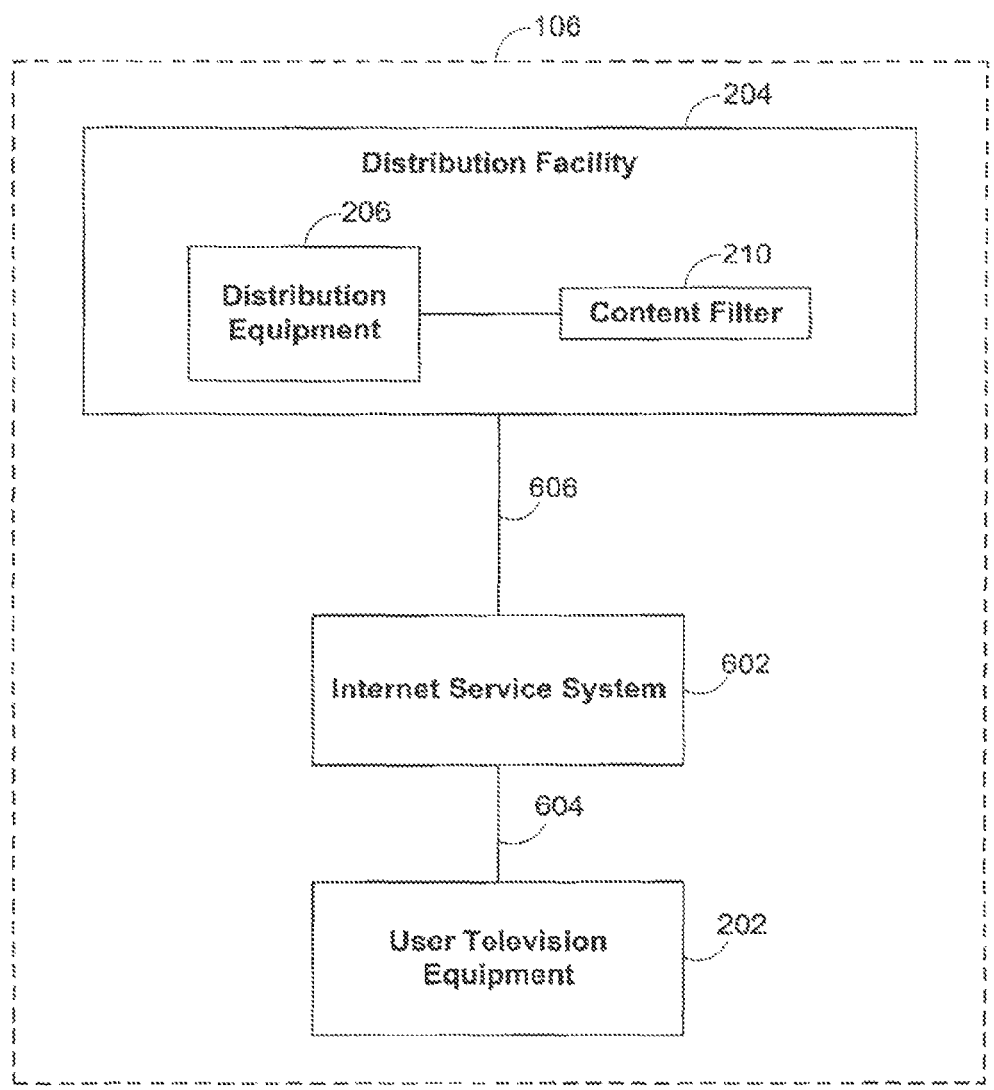

An interactive guidance application, such as an interactive television program guide, may run completely on user television equipment 202 as shown in FIGS. 2, 5 and 6, or it may run partially on user television equipment 202 and partially on server 302 using a suitable client-server or distributed processing arrangement as shown, for example, in FIGS. 3 and 4.

Distribution facility 204 of FIGS. 2-6 may be a satellite television facility, a cable system headend, a broadcast facility, a web site or any other suitable facility for receiving audio-friendly data and other program guide data from main facility 102 (FIG. 1) (or from any other suitable facility) and distributing the data to user television equipment 202 (FIGS. 2-6) with distribution equipment 206. User television equipment 202 of FIGS. 2-6 may be any suitable equipment that is capable of receiving, processing, and displaying data in an electronic program guide application, such as personal computer televisions (PC/TVs), personal computers, cable set-top boxes or satellite receivers with sufficient processing capabilities and display devices.

Distribution equipment 206 may include, for example, suitable transmission hardware for distributing program guide data or a television channel sideband, in the vertical blanking interval (VBI) of a television channel, using an in-band digital signal, using an out-of-band digital signal, or by any other suitable data transmission technique. In some embodiments, distribution facility 204 may generate program guide data. For example, content filter 210 may generate or identify (or an operator at such a computer may input) listings or other information for audio-friendly content.

Distribution equipment 206 of FIGS. 2-5 may distribute audio-friendly data and other program guide data to user television equipment 202 over communication path 208. Communication path 208 of FIGS. 2-5 may be a satellite path, a broadcast link, a fiber-optic link, a cable link, a combination, of such links, or any other suitable link, communication path 208 may have sufficient bandwidth to allow distribution facility 204 or another distribution facility to distribute programming. There are typically multiple pieces of user television equipment 202 and multiple associated communication paths 208, although only one example of each is shown in FIGS. 2-5 to avoid over-complicating the drawings.

Content filter 210 of FIGS. 2-7 may be any suitable combination of hardware and software programmed to identify audio-friendly content. For example, content filter 210 may identify audio-friendly television-based programs (e.g., television programs, pay-per-view programs, on-demand programs, or other programs suitable for television viewing) having, for example, associated audio tracks that contain supplemental audio information (e.g., narration tracks) that describe the visual portion of the content. As another example, content filter 210 may identify Internet-delivered audio-friendly content (e.g., web sites), software applications, or any other non-guide applications, that contain or provide, for example, audio clips or streams that describe the visual portion of the content. As another example, content filter 210 may identify audio-friendly content that has associated tone indicators that indicate various visual options, categories, listings, or any other suitable visual portion of the content. As yet another example, content filter 210 may be a computer programmed to allow an operator to manually identify audio-friendly content.

In some embodiments, audio-friendly data may originate from distribution facility 204. For example, content filter 210 may generate or identify audio-friendly indicators for certain content to reflect the content's audio-friendly status. As another example, an operator at distribution facility 204 may input audio-friendly data or other program guide data using content filter 210.

Distribution facility 204 of FIGS. 2-5 may have screen generator 212 for generating passive guide display screens. Screen generator 212 may be any suitable combination of hardware and software programmed to generate passive guide display screens. Screen generator 212, may be, for example, a Windows NT process running on a personal computer with a Pentium III microprocessor. Screen generator 212 may use an object-oriented approach to generate passive guidance display screens. Such an approach may allow one main facility 102 to provide and manage a number of different passive electronic program guides and other video products from a central location. Screen generators that may be used to create passive guidance display screens using an object-oriented approach are described, for example, in Kern et al. U.S. patent application Ser. No. 09/332,539, filed Jun. 11, 1999, which is hereby incorporated by reference herein in its entirety.

In embodiments for hybrid guides, screen generator 212 may track passive electronic program guide characteristics such as the currently displayed screen components of the passive electronic program guide display screen (e.g., videos, program listings grid, etc.), the size and location of the components, the listings that are being displayed, the period with which listings are paged or the speed with which listings are scrolled, the active program segment in the video portion of the guide, the content of the videos (e.g., programs or products that are promoted by a video), the channel and call letters of the passive guide, a source identifier or other identifier of the passive guide, or any other suitable passive guide characteristics. The passive guide characteristics may be provided to distribution equipment 206 (or server 302 of FIGS. 3 and 4 in a client-server based approach). The passive electronic program guide characteristics may be provided to the electronic program guide or a guide client periodically, continuously, on-demand, or with any other suitable frequency based on the system architecture underlying the guide. Other features of hybrid guides are described, for example, in Knudson et al. U.S. patent Ser. No. 09/357,941, filed Jul. 16, 1999, which is hereby incorporated by reference herein in its entirety.

FIGS. 3 and 4 illustrate two client-server arrangements for providing an interactive television program guide. Client-server program guide systems are described, for example, in Ellis et al. U.S. patent application Ser. No. 09/374,043, filed Aug. 13, 1993, which is hereby incorporated by reference herein in its entirety. Server 302 may use any suitable combination of hardware and software to provide a client-server based interactive application. In some embodiments, server 302 may, for example, run a suitable database such as SQL Server by Microsoft to supply interactive application data to client queries generated by client software implemented on user television equipment 202. Some embodiments of the present invention may have server 302 residing at locations other than distribution facility 204. Other suitable locations may include, for example, main facility 102 (FIG. 1).

Program guide data stored on server 302 may be retrieved by a client running on user television equipment 202 using any suitable client-server based approach. For example, the client software running on user television equipment 202 may pass SQL requests as messages to server 302. Alternatively, the client software may also use remote procedure calls to invoke remote procedures stored on server 302. In yet another approach, client software running on user television equipment 202 may execute client objects that use an object request broker (ORB) to communicate with server objects executed by server 302. This type of approach may be accomplished using Microsoft's Distributed Component Object Model (DCOM), Common Object Request Broker Architecture (CORBA), or any other distributed object computing architecture.

In some embodiments, server 302 may transmit audio-friendly data and other program guide data via communication path 208 to user television equipment 202 for further processing and program guide display generation. For example, user television equipment 202 may process the data to generate audio-friendly listings screens in interactive television program guides. In other embodiments, server 302 may generate program guide displays such as audio-friendly listings screens to be downloaded by a "thin client". If desired, server 302 may be located at locations other than distribution facility 204, such as at main facility 102 of FIG. 1, external information service 112 of FIG. 1, or any other suitable location.

In the example of FIG. 4, program guide data may be provided by main facility 102 (FIG. 1) to distribution facility 204 via the Internet and Internet service system 402. Internet service system 402 may be any suitable combination of hardware and software capable of providing audio-friendly data and other program guide using an Internet based approach (e.g., using Hypertext Transfer Protocol (HTTP)).

In some embodiments, guidance application equipment 106 may obtain program guide data from main facility 102 of FIG. 1 via the Internet as shown in FIG. 5. Distribution facility 204 may, for example, include Internet service system 502. Internet service system 502 may be any combination of hardware and software suitable for providing program guide data from the Internet to distribution equipment 206 using an Internet-based approach. One such approach may involve, for example, exchanging data using a protocol stack including HyperText Transfer Protocol (HTTP) and Transfer Control Protocol/Internet Protocol (TCP/IP).

Another suitable arrangement of an Internet-based approach is shown in FIG. 6. In this example, user television equipment 202 may be connected to Internet service system 602 via link 604. Internet service system 602 may include any suitable combination of computer hardware and software capable of providing program guide data from distribution equipment 206 to user television equipment 202 using an Internet-based approach. One such approach may involve, for example, exchanging data using a protocol stack including HyperText Transfer Protocol (HTTP) and Transfer control Protocol/Internet Protocol (TCP/IP). Internet service system 602 is shown as obtaining guidance application data from distribution facility 204 over communication link 606. Communication links 604 and 606 may have sufficient bandwidth to allow distribution facility 204 to distribute television programming and other video media to user television equipment 202 via Internet service system 602.

Figure 7:
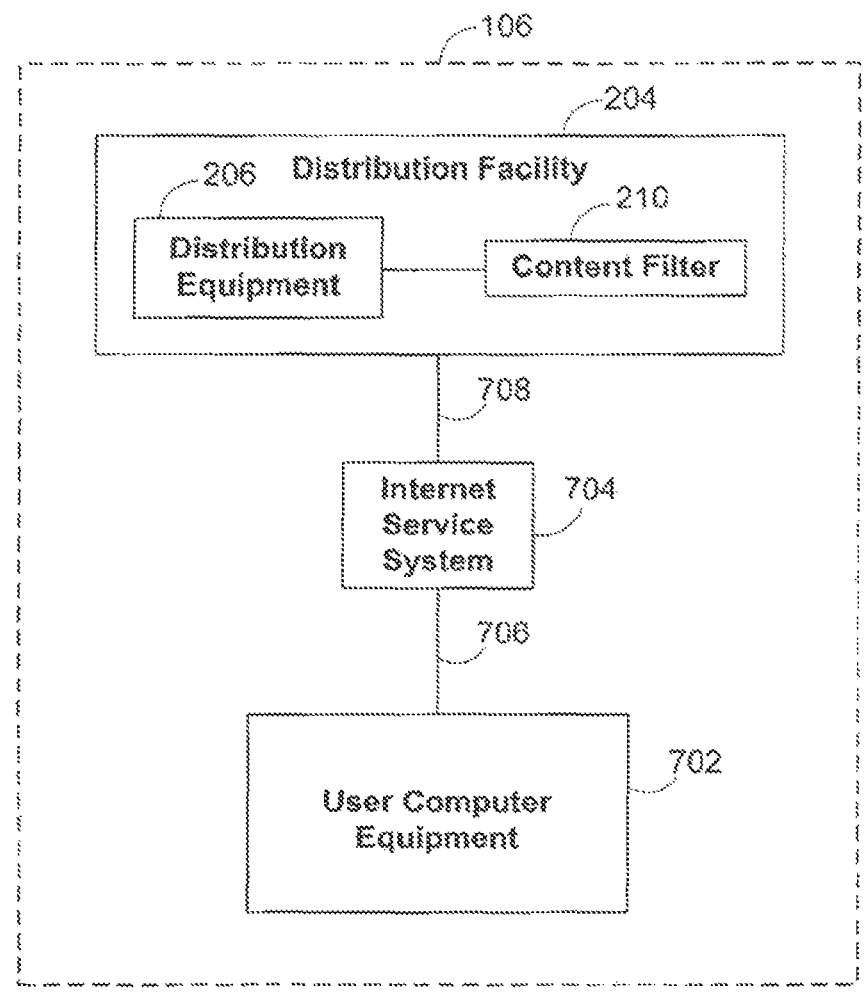

FIG. 7 shows an illustrative arrangement for an on-line program guide. Illustrative on-line program guide systems are described, for example, in Boyer et al. U.S. patent application Ser. No. 08/938,028, filed Sep. 18, 1997, which is hereby incorporated by reference herein in its entirety. A program guide client or web browser may be implemented on user computer equipment 702. User computer equipment 702 may include, for example, a personal computer, and may be connected to internet service system 704 via Internet link 706. Internet service system 704 may include any suitable combination of computer hardware and software capable of providing program guide data from distribution equipment 206 to personal computer equipment 702 using an Internet-based approach (e.g., using TCP/IP and HTTP).

In this example, distribution facility 204 is a web site. Distribution facility 204 receives audio-friendly data and other program guide data from main facility 102 (FIG. 1) (or from any other suitable facility) and provides the data to internet service system 704 over Internet link 708 with distribution equipment 206. In other suitable approaches, Internet service system 704 may obtain audio-friendly data and other electronic program guide data from other systems such as main facility 102 (FIG. 1).

Figure 8:
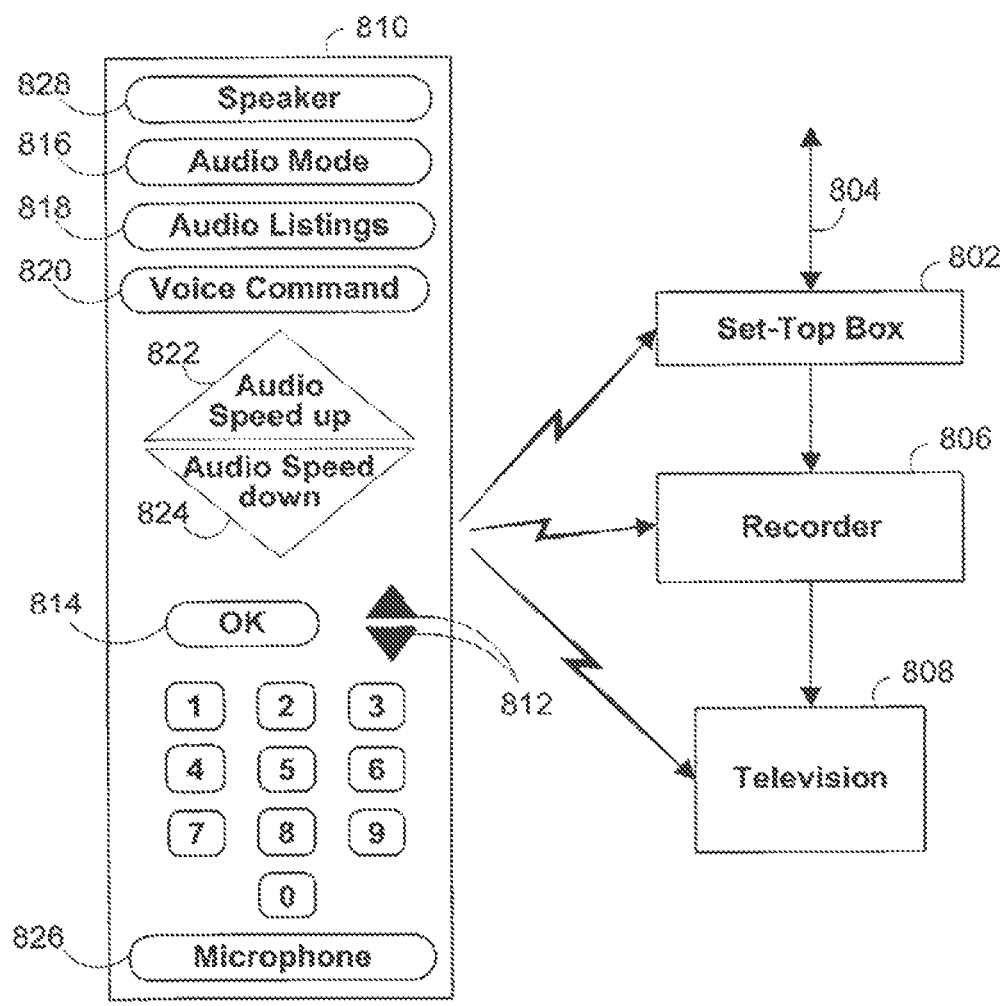
FIG. 8 is a schematic diagram of the illustrative user television equipment of FIGS. 2-6 in accordance with one embodiment of the present invention.

FIG. 8 shows an illustrative arrangement for user television equipment 202 of FIGS. 2-6 in accordance with one embodiment of the present invention. User television equipment may have set-top box 802 containing tuning circuitry capable of receiving analog or digital programming (e.g., television programming, pay-per-view programming, on-demand programming, or other suitable programming) and program guide data through link 804. Set-top box 802 may also pass signals to be recorded by recorder 806. Set-top box 802 may control the operation of recorder 806 by, for example, issuing infrared commands that are received by recorder 806 at the same inputs at which standard remote control commands are received.

Recorder 806 may be any suitable analog or digital device suitable for recording television programming. For example, recorder 806 may be an analog videocassette recorder. As another example, recorder 806 may be a digital personal video recorder (PVR) that allows users to real-time VCR-like controls over television programs.

Television 808 may be connected to recorder 806 as shown, or to set-top box 802 (not shown). Television programming and application-generated graphical displays may be passed from set top box 802 to television 808 through recorder 806. Set-top box 802 may contain memory and processing circuitry capable of supporting guidance applications such as hybrid or interactive television program guides.

A remote control 810 such as an infrared remote control may be used to control set-top box 802, recorder 806, and television 808. Buttons such as up and down arrow buttons 812, OK button 814, audio mode button 816, audio listings button 818, voice command button 820, audio speed up button 822, audio speed down button 824, or other suitable buttons, may be included on remote control 810. In some embodiments, a voice recognition system may be incorporated into set-top box 802 to allow users co control set-top box 802, recorder 806, and television 808 with voice commands. For example, voice commands such as "Audio Mode", "Audio Listings", and "OK", may be used in place of buttons 816, 818 and 814, respectively, on remote control 810. In some of these embodiments, microphone 826 may be installed in remote control 810 to receive voice commands. In other embodiments, another device suitable for receiving voice commands (e.g., a wireless digital cellular phone) may be used. Some embodiments may provide speaker 628 or any other suitable audio output device in remote control 810 to output audio prompts. Interactive television program guide systems with speech interfaces are described, for example, in Reichardt et al. U.S. patent application Ser. No. 03/823,707, filed Mar. 30, 2001, which is hereby incorporated by reference herein in its entirety.

Figure 9:
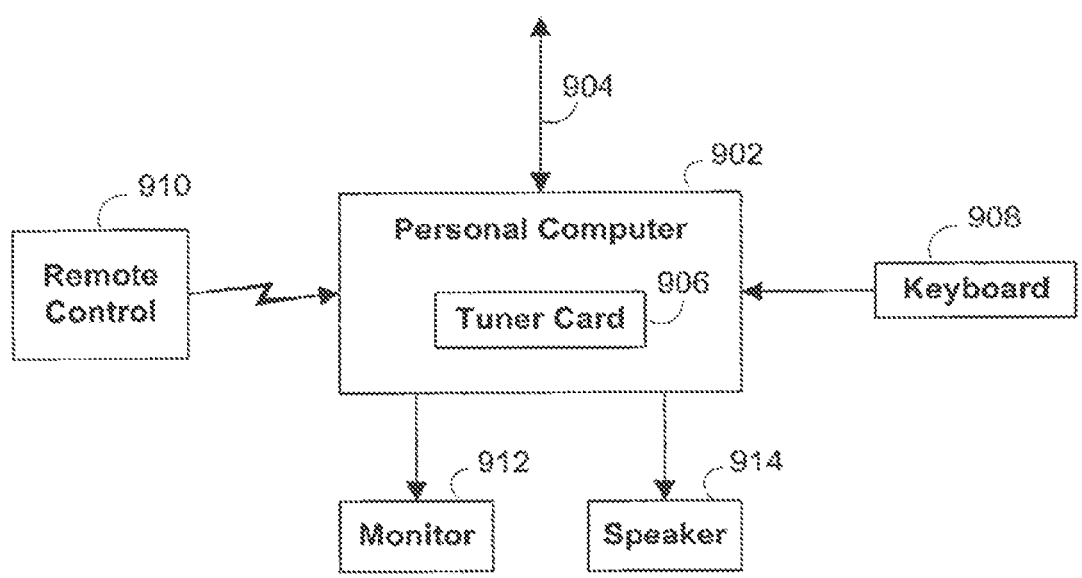
FIG. 9 is a schematic diagram of the illustrative user computer equipment of FIG. 7 in accordance with one embodiment of the present invention.

FIG. 9 shows an illustrative arrangement for user computer equipment 702 of FIG. 7 in accordance with one embodiment of the present invention. User computer equipment 702 may include personal computer 902 that receives television programming and information for interactive services using input path 904. Personal computer 902 may contain a tuner card 906 or other suitable circuitry for handling both analog and digital signals. Personal computer 302 may also contain memory and processing circuitry for supporting electronic program guidance activities and non-guide services such as Internet access (not shown).

The user may interact with personal computer 902 through suitable input interfaces such as keyboard 908, or a trackball, mouse, touch pad, a voice recognition system, or other suitable input device, if desired, the user may interact with personal computer 902 using a wireless remote control such as remote control 910. Television programming and application-generated graphical displays may be displayed on monitor 912. Audible outputs may be provided by speaker 914.

Figure 10:
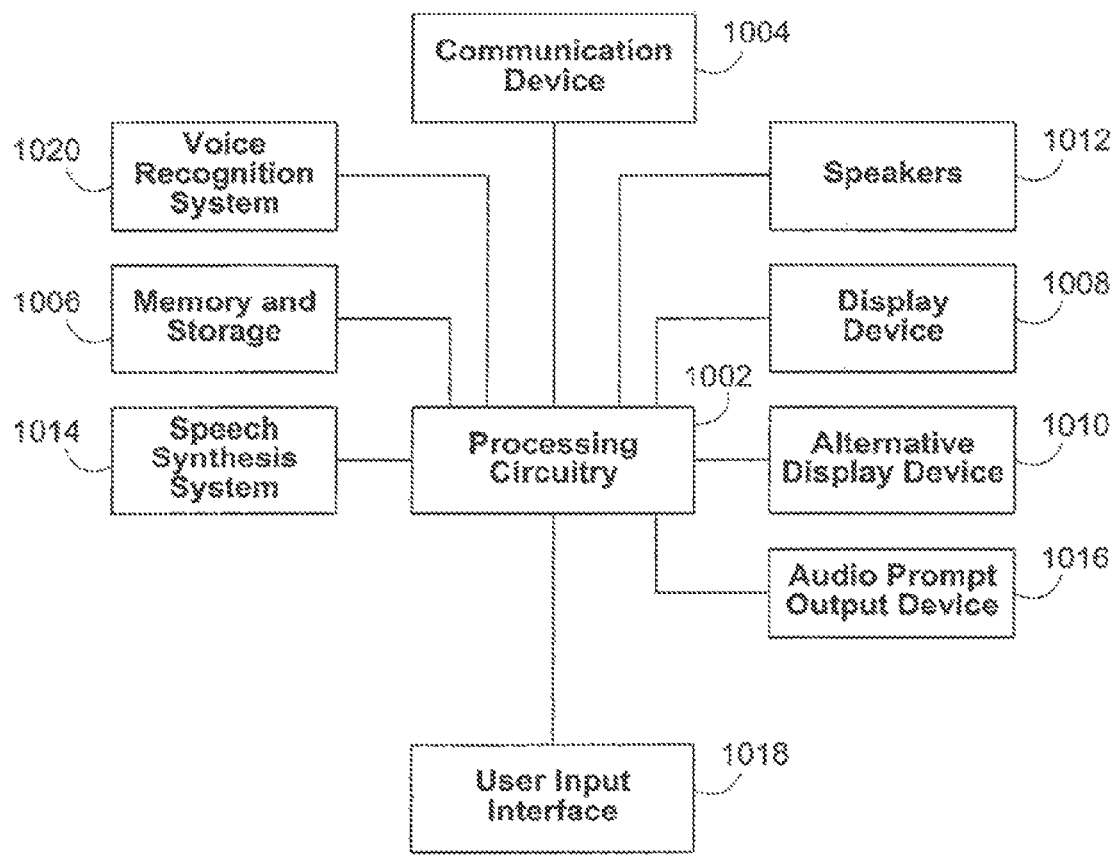
FIG. 10 is a generalized schematic diagram which may represent portions of the illustrative user television equipment of FIGS. 2-6 and the user computer equipment of FIG. 7 in accordance with one embodiment of the present invention.

FIG. 10 shows a generalized schematic diagram which may represent portions of user television equipment 202 of FIGS. 2-6 and user computer equipment 702 of FIG. 7 in accordance with one embodiment of the present invention. Processing circuitry 1002 may receive audio-friendly data and other program guide data from distribution facility 204 (FIGS. 2-5), Internet service system 602 (FIG. 6), Internet service system 704 (FIG. 7), or other suitable equipment or location and access interactive services through communication device 1004. Communication device 1004 may be a modem (e.g., a cable modem, digital subscriber line (DSL) modem, telephone modem, integrated services digital network modem (ISDN) modem, or any suitable analog or digital modem), network interface card (e.g., an Ethernet card, token ring card, etc.) or any other suitable communication device. Processing circuitry 1002 may also run application instructions and direct other system elements to provide guidance and user interface features.

Audio-friendly data and other program guide data may be stored in memory and storage 1006. Memory and storage 1006 may be any memory or other storage device, such as random access memory (RAM), read only memory (ROM), flash memory, a hard disk drive, or a combination of such devices, that is suitable for storing program guide data, application code, or a combination thereof, for processing by processing circuitry 1002. Video for television-based programs (e.g., television programs, pay-per-view programs, on-demand programs, or other programs suitable for television viewing), Internet-delivered content, and non-guide applications may be displayed on display device 1008.

Display device 1008 may be a television, a computer monitor, or any other suitable display device. Display screens including menus, listings displays or other suitable elements or overlays may also be displayed on alternative display device 1010 to allow for supplemental displays. For example, alternative display device 1010 may be a handheld device (e.g., a remote control), a monitor, or any other suitable device. Audio associated with displayed programming may be played on speakers 1012. Speakers 1012 may be separate from display device 1008 or integrated into display device 1008. In embodiments that provide audio prompts, audio prompts may be generated by speech synthesis system 1014 and outputted on audio prompt output device 1016. Audio prompt output device 1016 may be a second set of speakers such as speaker 828 embedded in remote control 810 (FIG. 8). Other devices suitable for outputting audio information (e.g., a wireless digital cellular phone) may also be used. Some embodiments may not include audio prompt output device 1016 and may instead output audio prompts using speakers 1012.

User input interface 1018 may include any suitable input device, such as a remote control, a keyboard, a handheld computer, a mouse, a trackball, or a touch pad that may be used by the user to interact with the guidance application. Appropriate voice input device such as, for example, a microphone connected to voice recognition system 1020, a wireless microphone embedded in a remote control, a wireless digital cellular phone, or any other suitable voice input device, may also serve as an interface for the user to interact with the guidance application.

Audio-based guidance features in accordance with the present invention may be provided within electronic program guides, such as passive, interactive, and hybrid passive-interactive electronic television program guides, and other suitable guidance applications (e.g., guidance applications for non-television-based content, such as, for example, Internet-delivered content and software). Audio-based guidance features may include, for example, providing indications of audio-friendly content. Audio-friendly content may include, for example, television-based programs (e.g., television programs, pay-per-view programs, on-demand programs, or any other suitable programs for television viewing), Internet-delivered content (e.g., web sites), software applications, or any other interactive or passive content having audio characteristics which make such content desirable to users who have difficulty viewing or understanding the visual portion of such content. Audio-friendly television-based programs may have, for example, associated audio tracks that contain supplemental audio information (e.g., narration tracks) that describes the visual portion of the programs. Audio-friendly Internet-delivered content and software applications may contain, for example, audio clips or streams in addition to or instead of visual content to describe to the user what is being displayed on the screen. Other interactive or passive audio-friendly content may have audio-characteristics such as, for example, tone indicators that indicate various visual options, categories, listings, or any other suitable visual portion of the content to the user.

Figure 11:
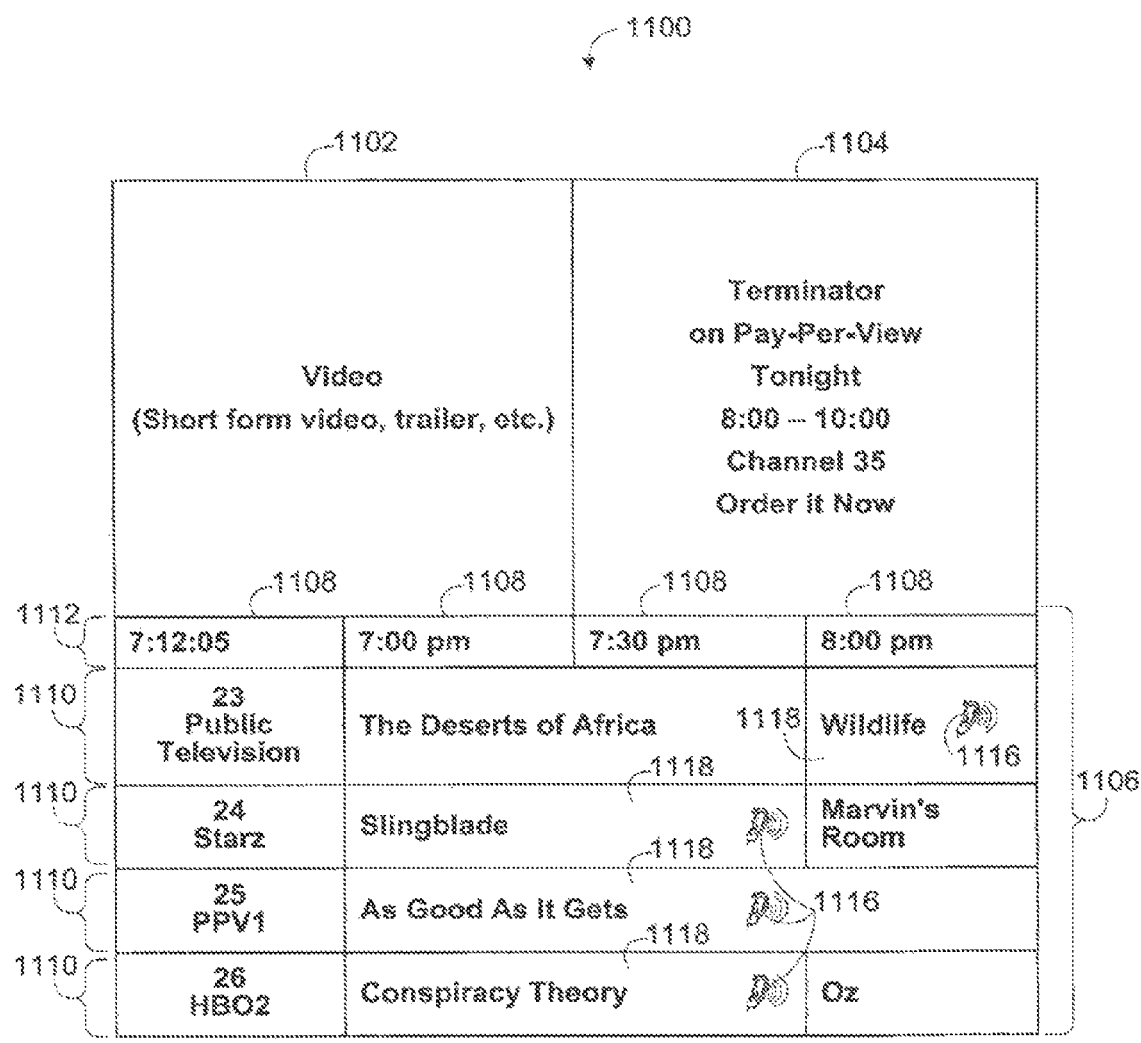
FIG. 11 is an illustrative passive electronic television program guide display screen in accordance with one embodiment of the present invention.
Figure 12:
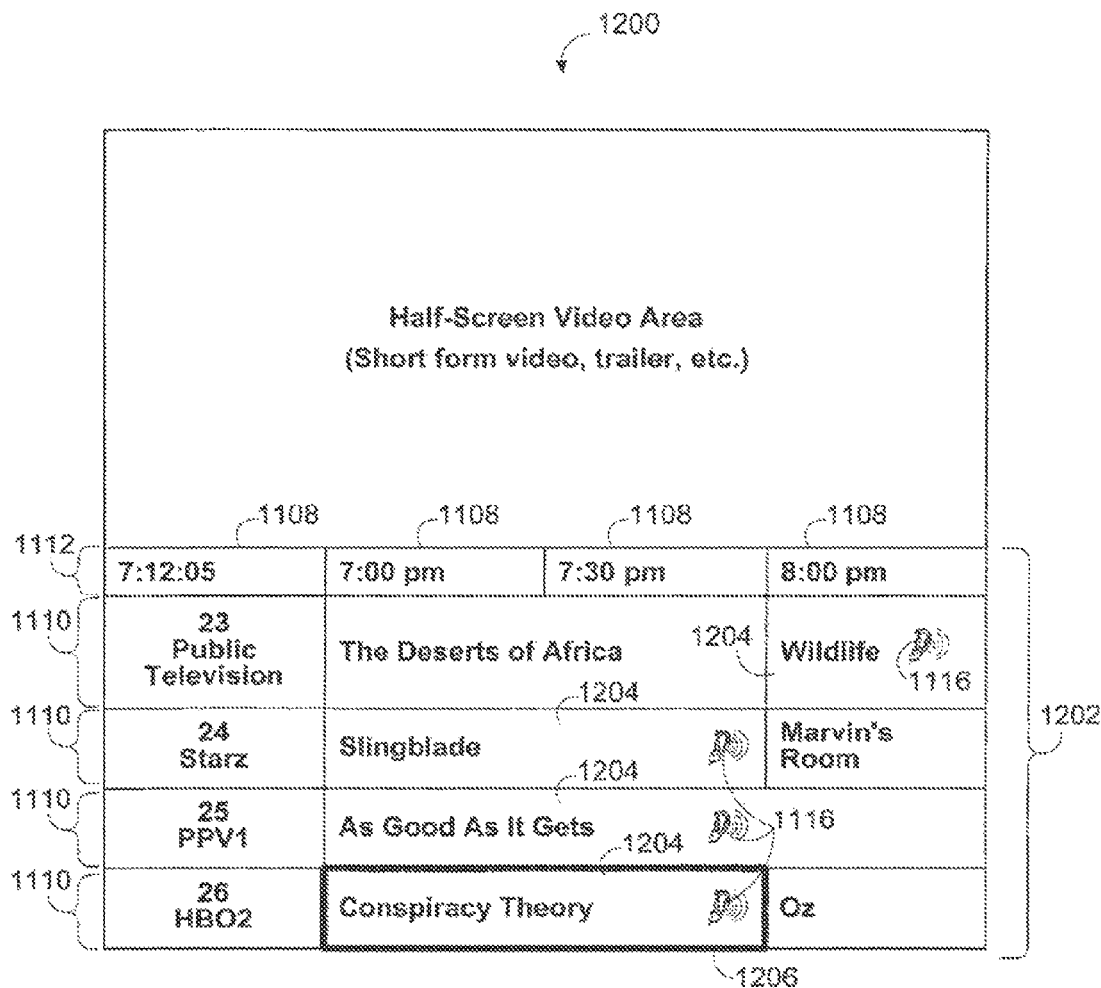
FIG. 12 is an illustrative hybrid electronic television program guide display screen in accordance with one embodiment of the present invention.
Figure 13:
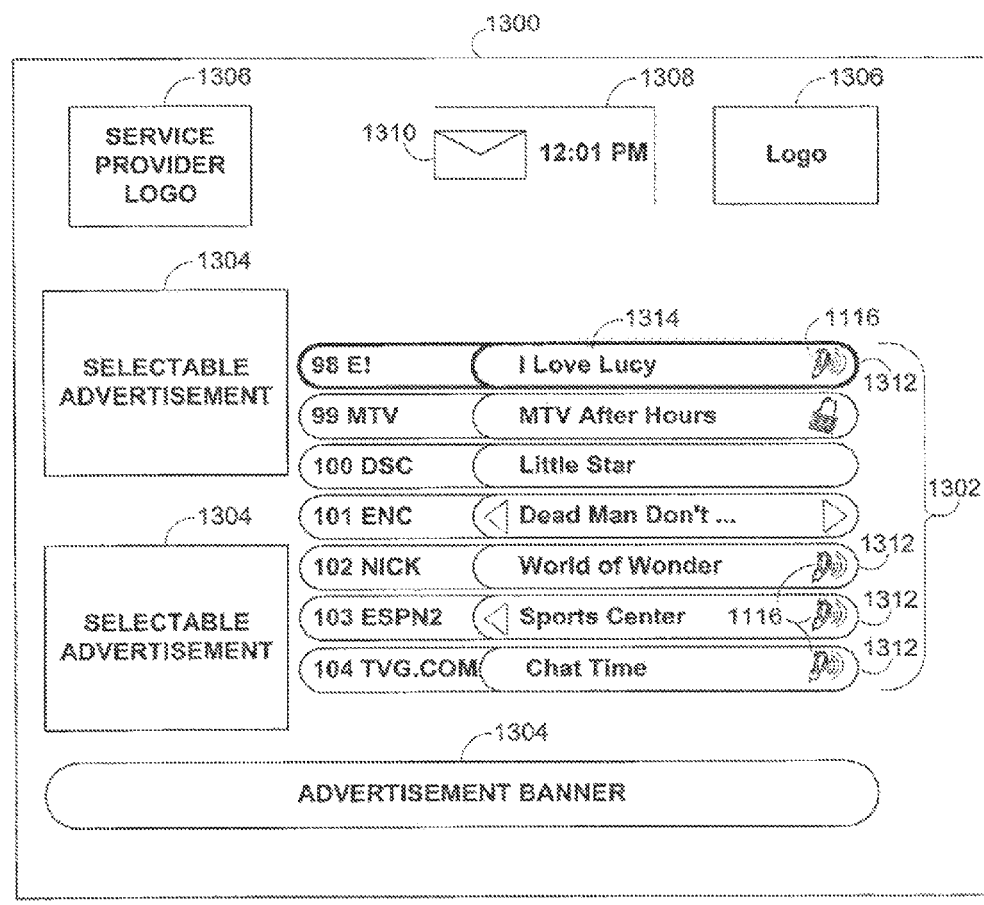
FIG. 13 is an illustrative interactive electronic television program guide listings display screen in accordance with one embodiment of the present invention.

In some embodiments for electronic television program guides, listings or other indicators of audio-friendly content may be provided. For example, a tone indicator (e.g., a single beep sound) may be provided to indicate the presence of audio-friendly content, some embodiments may provide listings of both audio-friendly content and regular content in the same listings display. The display characteristics (e.g., color, font, font-size, etc.) of listings for audio-friendly content may be different from that of listings for regular content. Some embodiments may provide tone indicators (e.g., beeping sounds) to indicate listings for audio-friendly content to the user (e.g., when the user first enters a screen, or in response to the user navigating to a listing). FIGS. 11-13 show three illustrative listings display screens for passive, hybrid, and interactive electronic television program guides.

FIG. 11 shows an illustrative passive electronic television program listings display screen 1100 as it may appear on a passive electronic television program guide channel in accordance with one embodiment of the present invention. Passive electronic program guide display screen 1100 may include multiple display areas such as video display area 1102, text display area 1104, and program listings grid 1106. Video display area 1102 may display video clips such as short form videos, trailers, and promotional videos to provide users with information regarding television programming, products, and other television-related subject matter. Text display area 1104 may display text information regarding, for example, the show time of a movie and its corresponding channel. In this example, show time and channel information are displayed for the pay-per-view movie Terminator.

Program listings grid 1106 may be divided into a number of columns 1108 corresponding to broadcast time intervals (e.g., thirty minute intervals) and a number of rows 1110 corresponding to different channels. Program listings grid 1106 may be scrolled continuously or have its pages changed periodically to display program listings for additional channels. The current time may be displayed by clock 1112.

In some passive guide embodiments, program listings grid 1106 may be dedicated to displaying listings of audio-friendly content (e.g., on a dedicated audio-friendly passive electronic television program guide channel). In other embodiments, such as in this example, listings grid 1106 may include both listings of audio-friendly content and listing of regular content. Graphical indicators such as audio-friendly indicators 1116, may be displayed next to audio-friendly listings 1118 to indicate their audio-friendly status. In some embodiments, a tone indicator (e.g., a single beep) may be outputted as audio-friendly listings 1118 first appear on the screen to indicate their audio-friendly status to the visually impaired users.

FIG. 12 shows an illustrative hybrid electronic television program guide display screen 1200 in accordance with one embodiment of the present invention. The hybrid guide may provide users with any number of interactive guide features while simultaneously providing users with the video portion of a passive guide. Hybrid electronic television program guide display screens such as screen 1200 may be generated automatically when user television equipment 202 (FIGS. 2-6) tunes to the passive program guide channel. The hybrid guide may be generated by an interactive electronic television program guide using any suitable overlay technique to overlay program listings grids, display areas, graphic display areas, video display areas, or interactive feature areas onto a passive electronic television program guide display screen, such as display screen 1100 (FIG. 11).

In this example, an interactive program listings grid 1202 containing both audio-friendly listings 1204, displayed with audio-friendly indicators 1116, and regular listings, is overlaid on top of passive program listings grid 1106 of FIG. 11. The interactive guide may indicate to the user that a hybrid guide is active by displaying highlight region 1206 in program listings grid 1106 (FIG. 11). The user may position highlight region 1206 by issuing appropriate commands through a suitable user interface such as a remote control, a keyboard, a mouse, a microphone, a wireless digital cellular phone, etc. For example, the user may speak "info" to obtain additional information for currently highlighted listing "Conspiracy Theory". In this example, the highlighted listing "Conspiracy Theory" is an audio-friendly listing. The guide may output a tone indicator (e.g., two beeps) in response to the user highlighting the listing to indicate its audio-friendly status. The guide may respond to a user request to obtain additional information for an audio-friendly listing by, for example, providing audio information in addition to text and graphical information to explain to the user what is being displayed. Audio and visual prompts may also be provided with the additional information to prompt the user to access a number of program guide features associated with the highlighted listing, such as, for example, creating a reminder for the program, saving the program as a favorite, schedule recording for the program, and any other suitable program guide features.

FIG. 13 shows an illustrative interactive program listings screen 1300 in accordance with one embodiment of the present invention that may be provided to a user of an interactive television program guide. Program listing screen 1300 may include a list of selectable program listings 1302, one or more selectable advertisements 1304, cable operator and sponsor logo graphics 1306, the current time 1308, and a mail-available indicator 1310. The menu of selectable program listings 1302 may include, for example, listings for television-based programs (e.g., television programs, pay-per-view programs, on-demand programs, or any other suitable television-based programs), Internet delivered content (e.g., web sites), and non-guide applications (e.g., email). In this example, listings for both audio-friendly content and regular content are included in the menu of selectable program listings 1302. The listings 1312 for audio-friendly content are graphically indicated by audio-friendly indicators 1116. A tone indicator (e.g., a single beep) may be provided to indicate to the user that listings for audio-friendly content are present when screen 1300 is initially displayed. Additional tone indicators (e.g., two beeps) may be provided to the user, for example, when the user navigates to a listing 1312 for audio-friendly content.

The bottom-most listing in list 1302 is for an Internet chat session, "Chat Time". In this example, the use may access the chat session by selecting its listing using a remote control or audible commands. In response, the guide may establish a session with the website "TVG.com" to provide the content (i.e., the chat session "Chat Time").

The user may highlight a selectable program listing or selectable advertisement by reposition highlight region 1314 on the display screen, by pressing "up" and "down" buttons on a remote control, by speaking voice commands "up" and "down" into a microphone, or using any other suitable approach. The user may request additional guidance features to be performed by, for example, positioning highlight region 1314 and selecting a listing using a remote control, by speaking a voice command to request for additional information (e.g., "info"), or using any other suitable approach.

Figure 14:
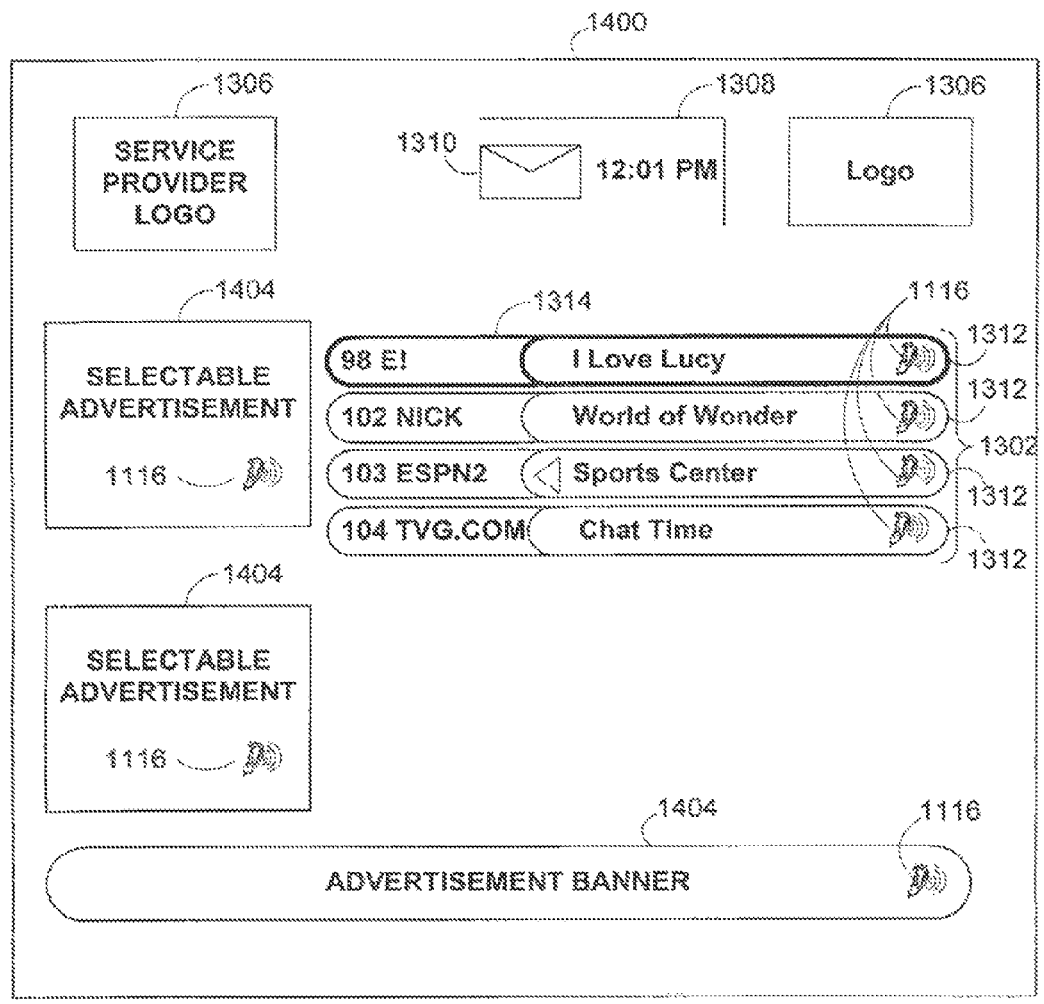
FIG. 14 is an illustrative electronic television program guide listings display screen dedicated to listings for audio-friendly content in accordance with one embodiment of the present invention.

Some embodiments may provide listings displays dedicated to listings for audio-friendly content. For example, a user of an interactive guide may request audio-friendly listings to be displayed separately by speaking a voice command into a microphone (e.g., "audio listings"), by pressing the "audio listings" button 818 (FIG. 8) on a remote control, or using any other suitable approach. An illustrative electronic television program guide listings display screen 1400 containing only selectable listings 1332 for audio-friendly content in accordance with one embodiment of the present invention is shown in FIG. 14. A user may interact with display screen 1400 by positioning highlight region 1314 on the display screen using "up" and "down" buttons on a remote control, by speaking voice commands "up" and "down" into a microphone, or using any other suitable approach. In the example of FIG. 14, advertisements 1404 are audio-friendly as indicated by audio-friendly indicators 1116. Audio-friendly advertisements may be provided in other displays, such as display 1300 of FIG. 13 (not shown).

Some embodiments for hybrid and interactive electronic television program guides may allow the user to set audio-friendly reminders to notify the user when certain audio-friendly television programs are about to be aired. Some embodiments may allow a user to set the scope of an audio-friendly reminder. For example, the user may set the criteria to include all listings of audio-friendly television programs available to the hybrid or interactive electronic television program guide. The user may be notified with an audio-friendly reminder when any of the television programs in the user-specified criteria is about air.

Figure 15:
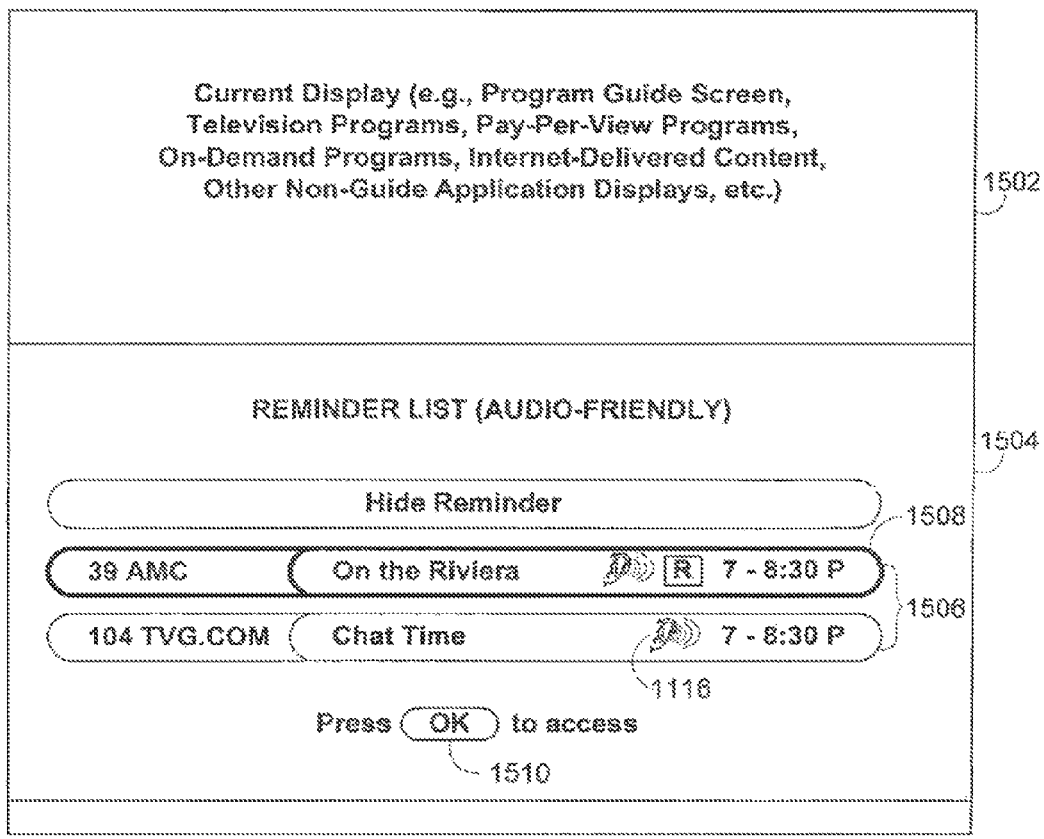
FIG. 15 shows an illustrative audio-friendly reminder overlay dedicated to listings for audio-friendly content in accordance with one embodiment of the present invention.

FIG. 15 shows an illustrative audio-friendly reminder overlay 1504 overlaid onto a video display screen 1502 displaying the content currently displayed (e.g., program guide screen, television programs, pay-per-view programs, on-demand programs, Internet-delivered content, other non-guide application displays, etc.) in accordance with one embodiment of the present invention. In this example, audio-friendly reminder overlay 1504 contains reminders for an audio-friendly television program and an audio-friendly chat session that are about to begin. A user way tune to a program or otherwise access content associated with a highlighted audio-friendly listing 1508 an audio-friendly reminder overlay 1504 by, for example, selecting OK prompt 1510 (or issuing a suitable voice command).

Figure 16:
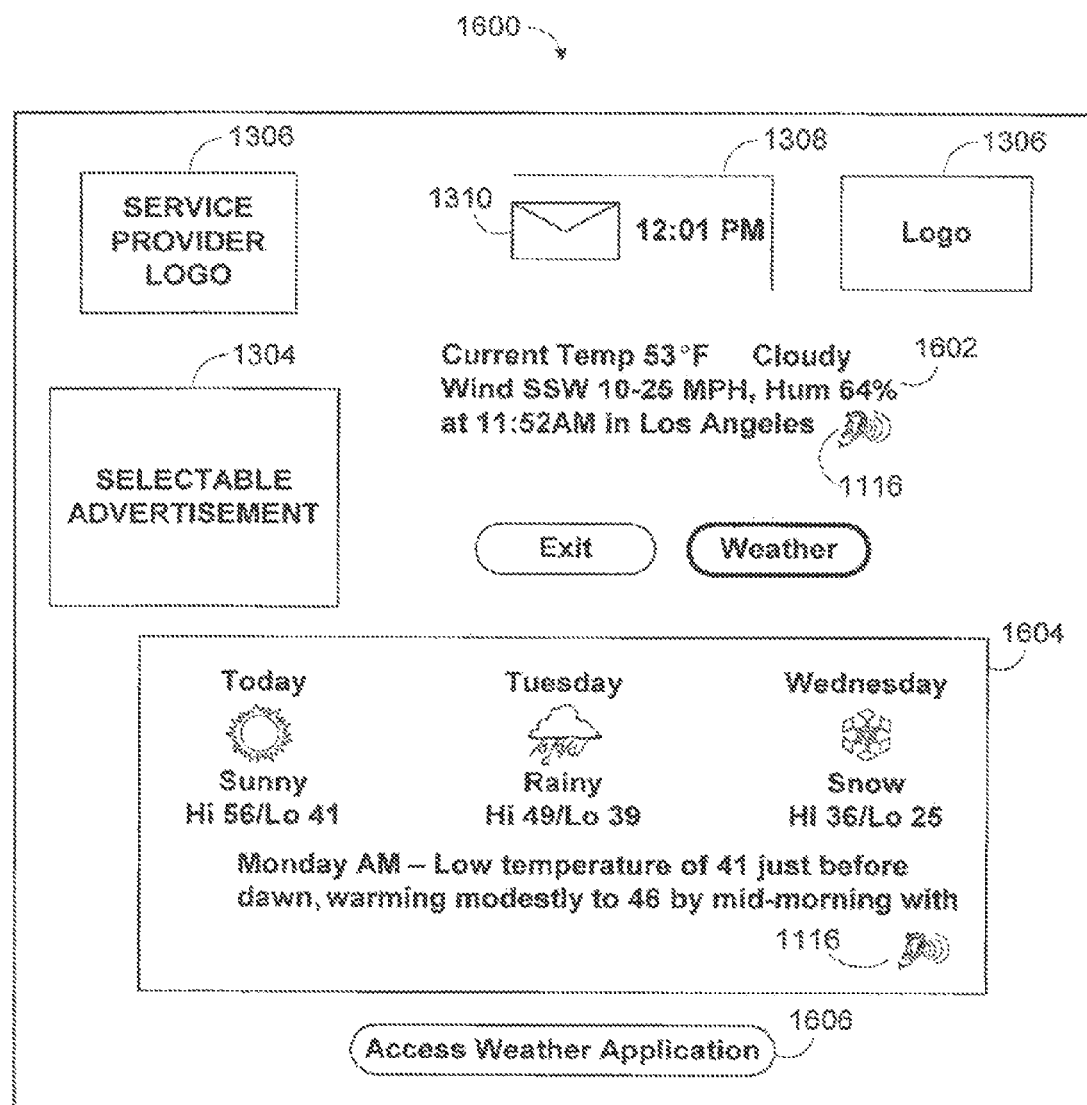
FIG. 16 shows an illustrative weather information display screen in accordance with one embodiment of the present invention.

Some embodiments may provide displays of audio-friendly information generated by sources other than main facility 102 (FIG. 1). For example, external information service 112 (FIG. 1) may provide audio-friendly local weather information to main facility 102 (FIG. 1) for distribution as part of program suite data. FIG. 16 shows an illustrative weather display 1600 for such information. The guide may provide weather display 1600 in response to, for example, a user selects a suitable option from a guide menu, or speaking a suitable command into user input interface 1018 (FIG. 10) (e.g. a "Weather" command). Weather display has audio friendly weather information 1602 and 1604 as indicated by audio-friendly indicator 1116. Weather display 1600 also includes option 1606. In response to a user selecting option 1606, the guide may launch a non-guide weather application that provides users with additional weather-related content (e.g., maps, tutorials, etc.).

Some embodiments of the present invention may provide audio prompts to audibly output all or portions of displayed information to indicate or describe what is being displayed on screen. Displayed information that may be read to the user may include, for example, information associated with guide displays (e.g., listings information including flip and browse information, additional program information prompts, menus, advertisements, promotions, pay-per-view, ordering information, setup instructions, etc.), information associated with Internet-delivered content (e.g., from web sites), information associated with non-guide applications, or any other suitable information. Some embodiments may provide audio prompts to indicate audio-friendly content to the user. For example, an audio prompt "audio-friendly" may be read to the user immediately after reading an audio-friendly listing (e.g., such as when navigated to by the user) to indicate the listing's audio-friendly status. As another example, tone indicators (e.g., various beeps) may be provided to indicate the audio-friendly status of listings.

Audio prompts may be stored in, for example, pre-recorded audio guide tracks. For example, passive electronic television program guides may have associated audio guide tracks from which program listings information may be read to the user as the corresponding program listings information is being scrolled or paged on the passive program guide channel. For example, a pre-recorded audio guide track may start off with reading the first row of program listings grid 1106 (FIG. 11)—"Channel 23, Public Television, 7:00 pm, The Deserts of Africa." This may be followed by an audio prompt for "8:00 pm, Wildlife, Audio-Friendly". In this example, additional audio prompt "Audio-Friendly" is read immediately after the listing for "Wildlife" to indicate its audio-friendly status. As another example, the listing for "Wildlife" may be followed by a tone indicator (e.g., a beep) to indicate its audio-friendly status.

In embodiments where audio prompts come from audio guide tracks in which audio prompts are generated from text by the guidance application (e.g., from closed caption text associate with a television program transmitted in the VBI of a television channel), users may be allowed to speed up or slow down the speed with which audio prompts are read to the user. For example, some visually impaired users are capable of "speed listening". They understand audio information at a much faster speed than users with normal listening skills. Such users may control the speed of audio by, for example, pressing "audio speed up" button 822 or "audio speed down" button 824, speaking "audio speed up" or "audio speed down", or using any other suitable approach.

Audio prompts may be provided for individual screens of hybrid and interactive electronic program guides. For example, program guide data from main facility 102 (FIG. 1) may include audio clips for components of display screens. For example, audio clips may provide general information informing the user the type of menu available, advertisements available, and any other suitable information about the display screen. The guidance application may retrieve and output audio prompts for an entire display screen when, for example, it is initially displayed. For example, the guide may audibly describe weather information 1602 and 1604 of weather display 1600 (FIG. 16) in response to the User accessing weather display 1600.

In other approaches, the guide may retrieve and provide audio prompts for individual display components when, for example, a user navigates to or selects the component. For example, user interactions with components of display screen 1300 (FIG. 13) may trigger speech synthesis from text associated with the particular display components. For example, audio for a listing in menu 1302 (FIGS. 13 and 14) may be generated when a user highlights the listing.

As another example, the display of audio-friendly reminder overlay 1504 may automatically activate the audio prompt feature to provide audio description regarding the content of overlay 1504. The guide may provide audio prompts to read to the user the audio-friendly listings displayed in audio-friendly reminder list 1506 and to prompt the user to, for example, select a listing from audio-friendly reminder list 1506, to tune to a television program highlighted by highlight region 1508, or perform another suitable reminder-related feature. Audio prompts associated with reminder overlay 1504 may be provided, for example, as audio generated by speech synthesis system 1014 (FIG. 10) from text, or pre-recorded audio clips.

Figure 22:
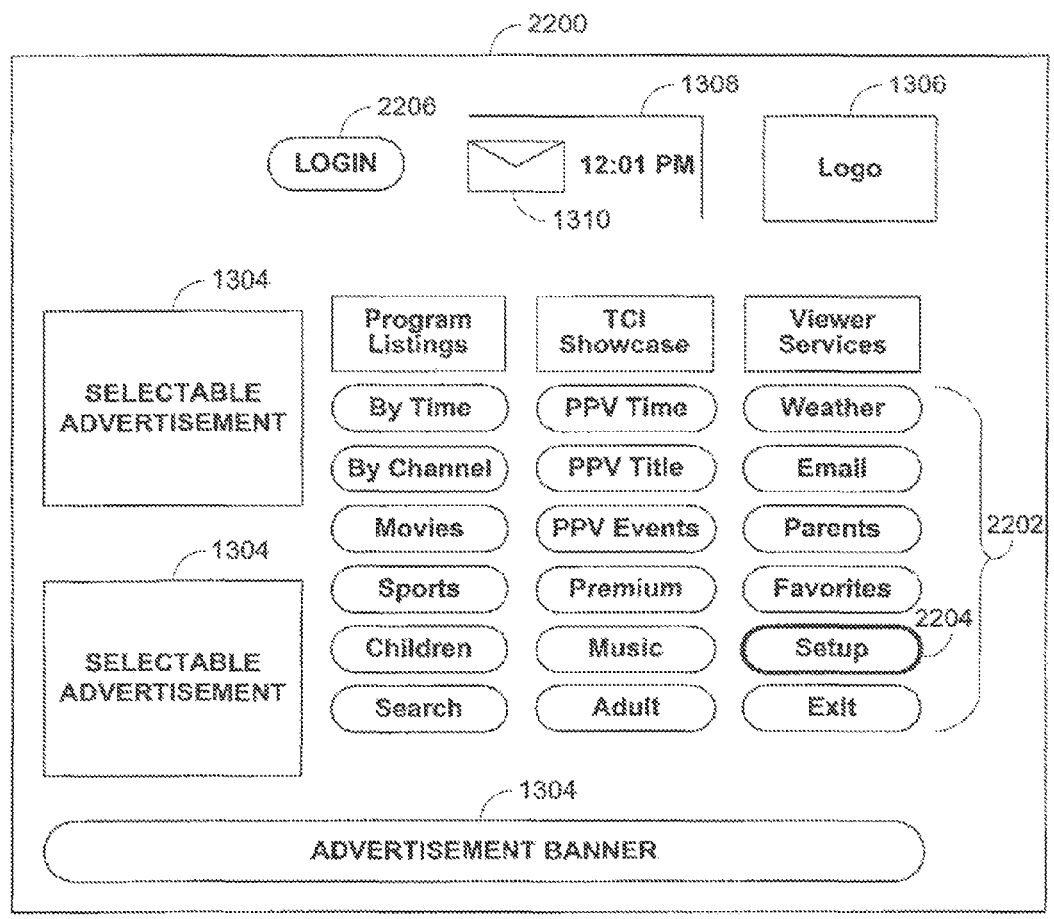
FIG. 22 is an illustrative interactive electronic television program guide menu display screen in accordance with one embodiment of the present invention.

As another example, the guide may automatically provide audio prompts to announce the availability of non-guide applications. For example, the guide may automatically output "Weather Application Available" when weather information display 1600 (FIG. 16) is displayed. As another example, the guide may automatically output "email" when an option for an email application is presented (see, for example, the main menu of FIG. 22 below). The user may select such options to access the associated application. In response, the guide may launch the application. In this way, the guide may act as a "audio portal" to these non-guide applications.

Some embodiments may activate the audio prompt feature as a default feature of the electronic program guide. In other embodiments, the audio prompt feature may be activated by the user (e.g., by speaking an audio guide name into a microphone, by pressing the "Audio Mode" button 816 (FIG. 8) on a remote control, by selecting an audio prompt option displayed on the electronic program guide screen, or using any other suitable approach). In still other embodiments, the guide may automatically activate the audio prompt feature in response to a user accessing an audio-based guidance feature, such as, for example, displaying an interactive electronic television program guide screen dedicated to listings for audio-friendly content. For example, when screens 1300 (FIG. 13) and 1400 (FIG. 14) are initially displayed, the guide may automatically activate, the audio prompt feature to provide general information (e.g., audio description of the type of menu available, advertisements available, and description of other displayed components) and prompt the user to select audio-friendly listings 1312 (FIGS. 13 and 14). If audio-friendly advertisements, such as advertisements 1404 (FIG. 14) are present on the screens, audio prompts may be provided to read them to the user. Audio prompts may also be provided in response to user commands to highlight, select, or to perform any other suitable guidance activities. In other embodiments, the guide may automatically activate the audio prompt feature in response to a user accessing a user-identified audio-friendly guidance feature. For example, a user may identify the guide's parental control feature as an audio-friendly feature during setup. Whenever parental control information is displayed, the guide may automatically activate the audio prompt feature to provide associated audio prompts to the user.

Some embodiments for hybrid and interactive electronic television program guides may provide a speech-based user interface to allow users to issue voice commands in response to audio prompts. The guide may perform guidance activities based on user voice commands. Such guidance activities may include, for example, browsing, obtaining additional programming information, or any other suitable activities. In some embodiments, the speech interface may become activated when the audio prompt feature is activated, and may be deactivated automatically if no voice command is received within a specific time period (e.g., 5 seconds) to avoid executing unintended voice commands. If desired, the user may activate the speech interface independently of the audio prompt feature by speaking suitable command into a microphone (e.g., "voice command"), by pressing "voice command" button 820 (FIG. 8) on a remote control, or using any other suitable approach. The user may command the speech interface to remain active indefinitely, for example, by speaking another suitable command into a microphone (e.g., "continuous voice command"), by double pressing "voice command" button 820 (FIG. 8) on a remote control, or using any other suitable approach. The user may also command the speech interface to deactivate, for example, by speaking the voice command "sleep" into a microphone, by double pressing "voice command" button 820 (FIG. 8) on a remote control, or using any other suitable approach. The audio prompt feature may be deactivated independently of the speech interface by the user, for example, by speaking "audio off" into a microphone, by pressing "audio mode" button 816 (FIG. 8) on a remote control, or using any other suitable approach.

Figure 17:
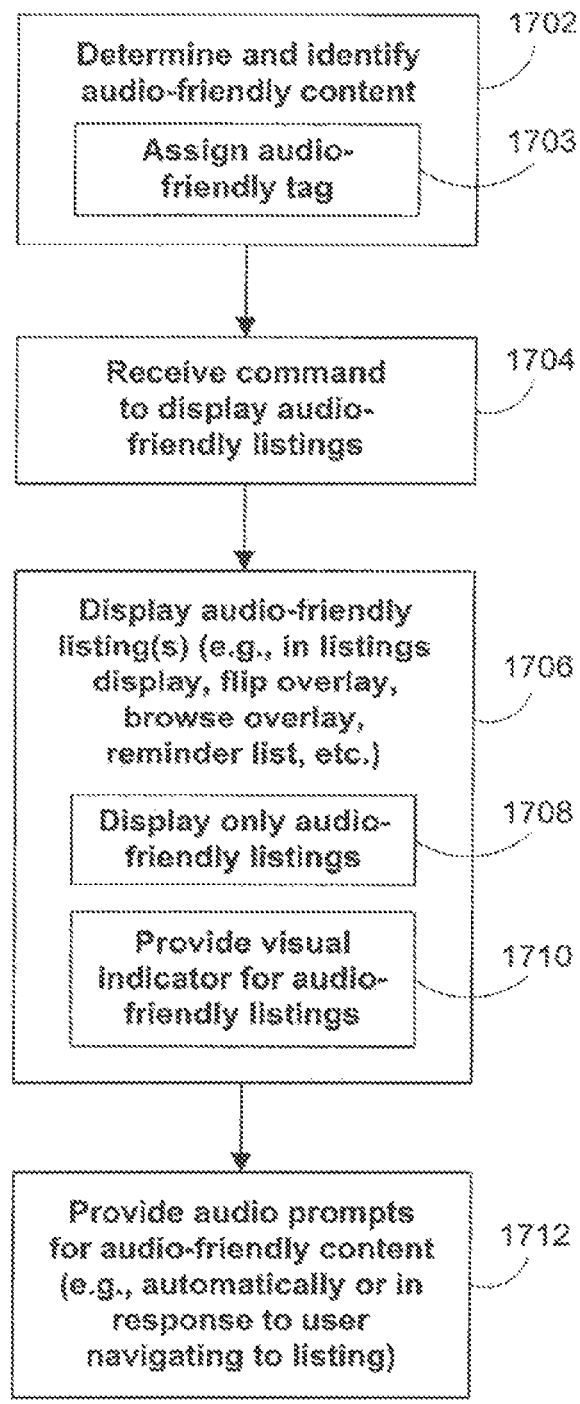
FIG. 17 is a generalized flowchart of illustrative steps involved in providing listings for audio-friendly content in accordance with one embodiment of the present invention.

FIG. 17 is a flowchart of illustrative steps involved in displaying listings for audio-friendly content in a listings or other display in accordance with one embodiment of the present invention. Whether content is audio-friendly is determined at step 1702. Step 1702 may take place at various guide data sources or locations, depending on the chosen implementation. Whether content is audio-friendly may be determined at, for example, main facility 102 (FIG. 1) or distribution facility 204 (FIG. 2-7).

Any suitable approach for determining and identifying audio-friendly content may be used. For example, a content provider may indicate whether or not content is audio-friendly in data associated with the content. An operator at main facility 102 (FIG. 1) or distribution facility 204 (FIGS. 2-7) may review the associated data and tag the content as audio-friendly using content filter 110 (FIG. 1) or content filter 210 (FIGS. 2-7) respectively (step 1703). Alternatively, the content provider may provide such tags within the associated data in an electronic format usable by the system. In still another illustrative approach, content filter 110 (FIG. 1) or content filter 210 (FIGS. 2-7) may analyze content and determine whether additional audio tracks, such as narration tracks, are provided with content, and may tag suitable content as audio-friendly in the program guide data based on such determination (at step 1703). For example, content filter 110 (FIG. 1) or content filter 210 (FIGS. 2-7) may search for certain tracks IDs assigned to navigation tracks. In some embodiments, content filter 110 (FIG. 1) or content filter 210 (FIG. 2-7) may search content to determine whether it is audio-friendly based on how much audio and video it contains. For example, content filter 110 (FIG. 1) or content filter 210 (FIGS. 2-7) may determine the percentages of original audio clips, streams, and text suitable for speech synthesis for a web site. If the combined percentage is high (e.g., compared to a pre-determined level that signifies audio-friendliness), the web site (or its content) may be tagged to indicate its audio-friendly status (step 1703).

The guide receives a command to display audio-friendly listings at step 1704. The command may be generated by the user of an interactive electronic television program guide by, for example, pressing "audio listings" button 818 (FIG. 8) on a remote control. The command may be generated by a user of a passive electronic television program guide by, for example, tuning to a passive program guide channel. At step 1706, a display of audio-friendly listings is generated. The display may be a listings display such as display screen 1100 (FIG. 11), 1200 (FIG. 12), 1300 (FIG. 13), and 1400 (FIG. 14), or a flip overlay, browse overlay, reminder list (such as reminder overlay 1504 of FIG. 15), or other overlay that includes one or more listings. These and other overlays and program guide display screens are described in, for example, Knudson et al. U.S. patent application Ser. No. 09/357,941, filed Jul. 16, 1999, which has already been incorporated by reference herein. The listings display may include only audio-friendly listings (step 1708). Whether or not the listings display includes only audio-friendly listings, such listings may be indicated with a visual indicator (step 1710).

At step 1712, audio prompts may be provided for audio-friendly content. A passive guide may output audible prompts for an entire display. An interactive or hybrid guide may, for example, provide prompts for an entire display, provide prompts only for those display items to which the user has navigated to or has selected, or provide prompts only for those display items that are associated with audio-friendly content (e.g., listings 1204 of FIG. 12, listings 1312 of FIGS. 13 and 14, listings 1506 of FIG. 15, or weather information 1602 and 1604 of FIG. 16).

Figure 18:
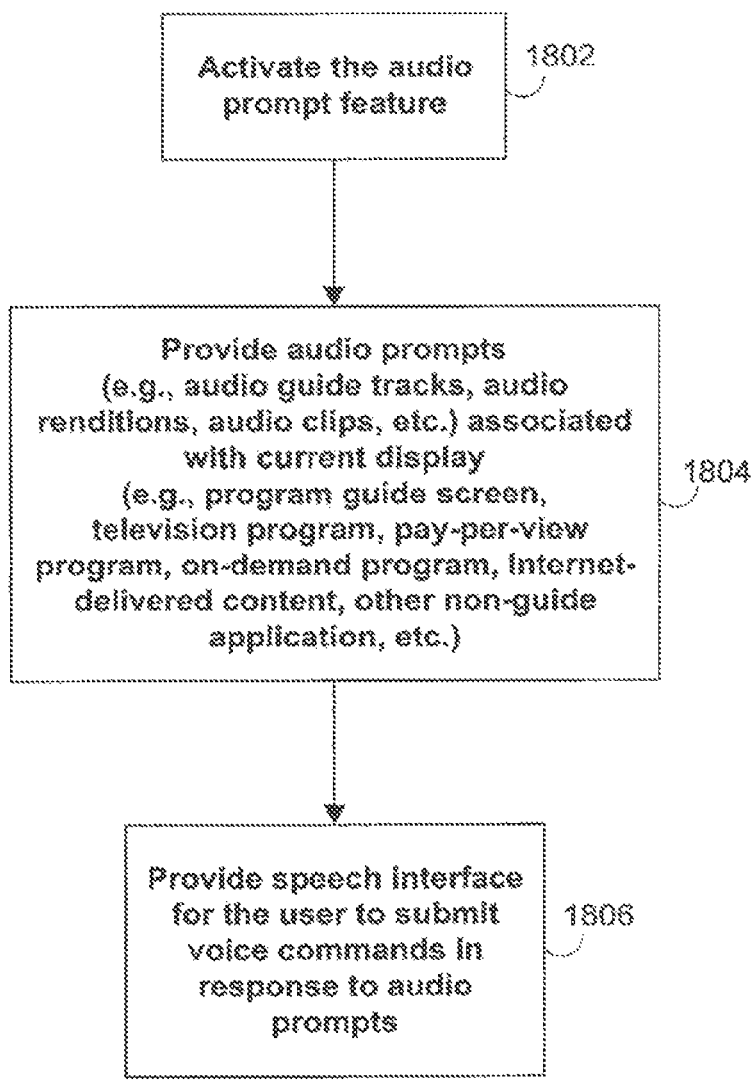
FIG. 18 is a flowchart of illustrative steps involved in providing audio prompts in accordance with one embodiment of the present invention.

A flowchart of illustrative steps involved in providing audio prompts in accordance with one embodiment of the present invention is shown in FIG. 18. At step 1802, the guide activates the audio prompt feature. This step may not be performed when, for example, the audio prompt feature is active by default. Once the audio prompt feature is activated at step 1802, audio prompts (e.g., audio guide tracks, audio renditions, audio prompts, etc) associated with the current display (e.g., program guide screen, television programs, pay-per-view programs, on-demand programs, Internet-delivered content, other non-guide applications, etc.) may be provided to the user at step 1804.

Figure 19:
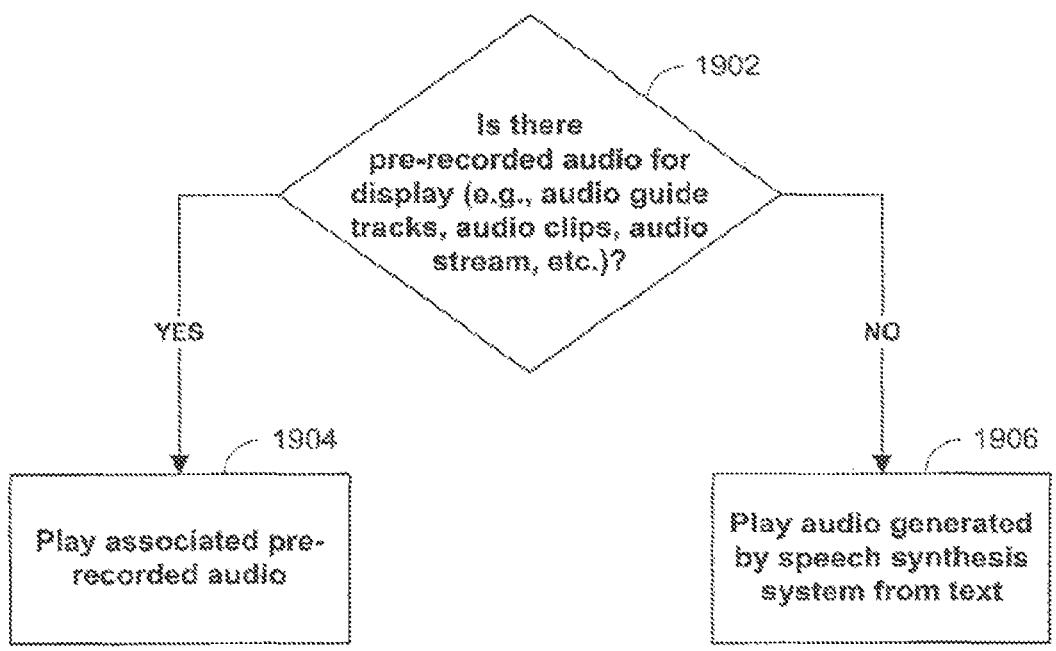
FIG. 19 is a flowchart of illustrative additional steps involved in providing audio prompts in accordance with one embodiment of the present invention.

FIG. 19 shows a more detailed flowchart of illustrative additional steps involved in providing audio prompts in an interactive program guide in accordance with one embodiment of the present invention, as shown at step 1804 of FIG. 18. At step 1902, the guide determines whether the current display (e.g., program guide screen, television programs, pay-per-view programs, on-demand programs, advertisements, commercials, Internet-delivered content, other non-guide applications, etc.) has pre-recorded audio (e.g., audio guide tracks, audio clips, audio stream, etc.) for providing audio prompts. If the current display is associated with pre-recorded audio, pre-recorded audio may be played for the user at step 1904. If it is determined that the current display is not associated with pre-recorded audio, speech synthesis system 1014 (FIG. 10), for example, may be utilized to generate audio from text on the current display using known text to speech conversion techniques. The generated audio may be played for the user at step 1906.

Figure 20:
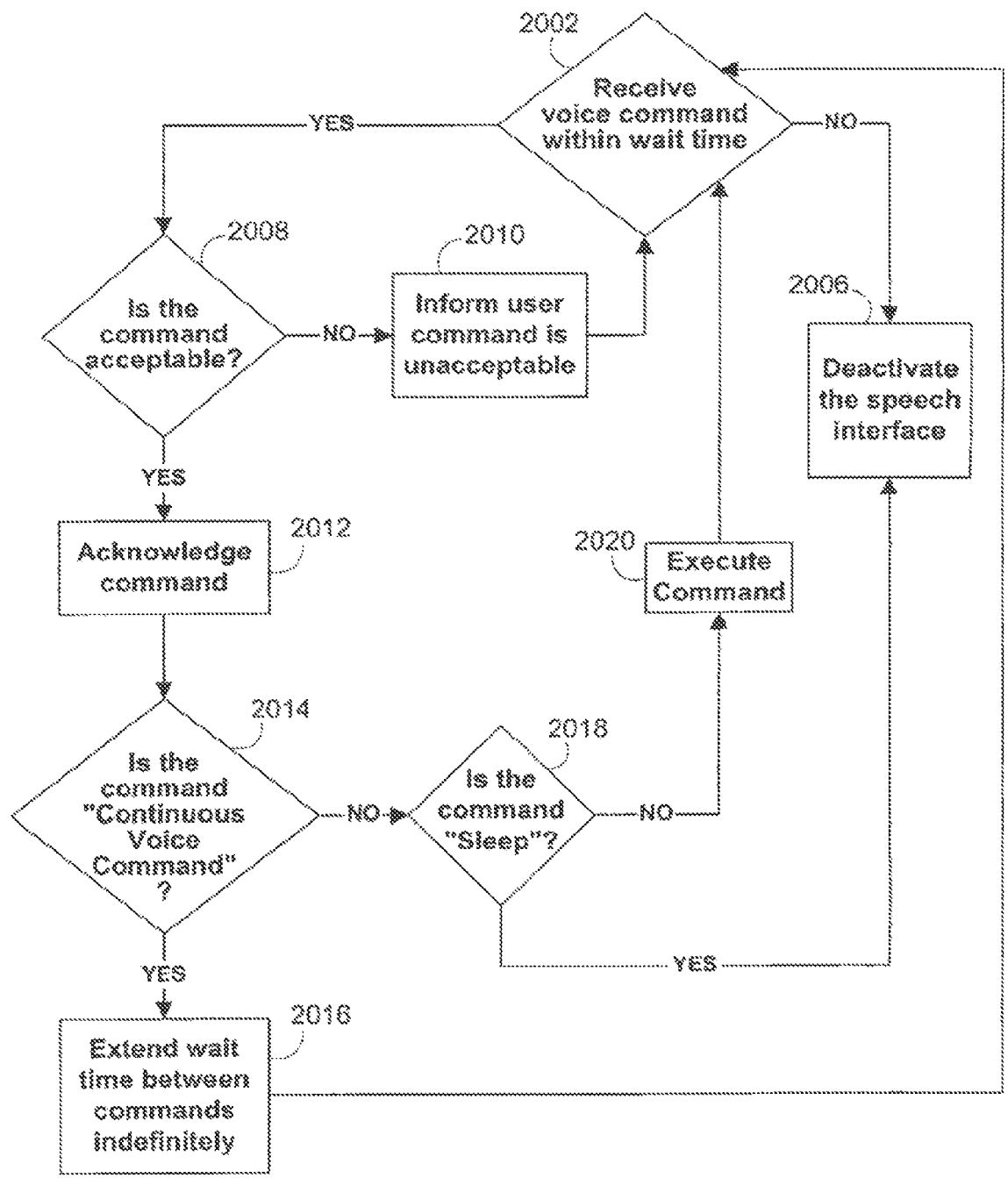
FIG. 20 is a flowchart of illustrative steps involved in receiving and executing voice commands in accordance with one embodiment of the present invention.

Returning briefly to FIG. 18, some embodiments for electronic program guides, such as hybrid and interactive electronic television program guides, may provide a speech interface for the user to submit voice commands in response to audio prompts at step 1806. The user may speak voice commands into a voice input device such as a wired or wireless microphone of user input interface 1018 (FIG. 10). FIG. 20 shows a more detailed flowchart of illustrative steps involved in providing a speech interface in accordance with one embodiment of the present invention as shown at step 1806 of FIG. 18.

At step 2002, the guide waits to receive a voice command from the user within a specific wait time period (e.g., 5 seconds). If no voice command is received within a predefined time period, the guide may deactivate the speech interface at step 2006 to avoid accidental execution of unintended voice commands. For example, the user may carry on a conversation while watching television, and parts of the conversation may be identical to certain voice commands specific to electronic program guides. A wait time period of, for example, 5 seconds, may be sufficient to allow the user to respond to an audio prompt, yet brief enough to prevent the execution of an unintended command.

If a voice command is received from the user within the wait time period at step 2002, the guide may evaluate the voice command for acceptability at step 2008. Voice recognition system 1020 (FIG. 10) may be utilized to interpret the voice command. If voice recognition system 1020 (FIG. 10) cannot interpret the voice command, the user may be informed that the command cannot be interpreted and must be resubmitted at step 2010. The user may be prompted again at step 2002 to speak a command within the allowed wait time period. On the other hand, if the voice command is understood by voice recognition system 1020 (FIG. 10) at step 2008, an audio prompt may be provided to the user to acknowledge the voice command at step 2012.

At step 2014, the voice command may be matched to a standard command for execution. If the voice command matches standard command to activate "continuous voice command", the wait time period of step 2002 may be extended indefinitely at step 2016. Speech interface may remain active indefinitely for the user to submit voice commands. If the voice command matches a standard command to deactivate the speech interface at step 2018 (e.g., "Sleep"), the speech interface may be deactivated at step 2006. If the voice command neither activates continuous voice command nor deactivates the speech interface, the voice command is executed at step 2020. The guide may thus provide a guidance feature based on the voice command. The user may be prompted again at step 2002 to issue additional voice commands.

Figure 21:
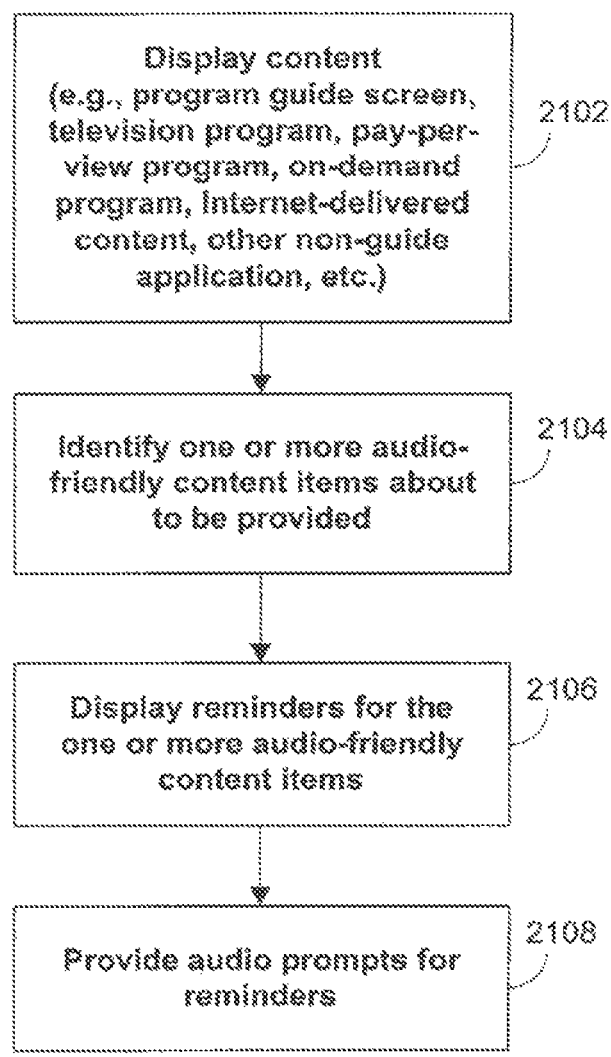
FIG. 21 is a flowchart of illustrative steps involved in providing audio-friendly reminders in accordance with one embodiment of the present invention.

FIG. 21 is a flowchart of illustrative steps involved in providing audio-friendly reminders in electronic program guides, such as hybrid and interactive electronic television program guides, in accordance with one embodiment of the present invention. At step 2102, a display of content is provided to the user (e.g., program guide screen, television program, pay-per-view program, on-demand program, internet-delivered content, non-guide application, etc.).

At step 2104, searches may be performed according to user-specified criteria to identify audio-friendly television programs that are about to begin broadcast. For example, a user may sec the scope of search to include all listings for audio-friendly television programs available to the hybrid or interactive electronic television program guide. Searches may be performed continuously or at regular intervals within the user-specified scope to identify audio-friendly television programs that are about to begin broadcast. Alternatively, users may set reminders for content by selecting an associated listing and pressing a suitable button on remote control (e.g., "reminder") or speaking a suitable command (e.g., "set reminder"). Once content is identified for reminders at step 2104, an audio-friendly reminder display containing listings for the identified content, such as overlay 1504 (FIG. 15), may be displayed to the user (step 2106). At step 2108, audio prompts may be provided for the reminder (as described, for example, in connection with FIGS. 18 and 19).

Some embodiments for electronic program guides, such as interactive electronic television program guides, may provide features specific to a user based on the user's identity. The identity of the user may be used by the program guide to store and access user a profile for the user, and to perform personalized guidance features for the user. FIGS. 22-25 show illustrative interactive electronic television program guide setup screens for allowing users to set up user accounts and indicate preferences for audio-based features in accordance with one embodiment of the present invention. Display 2200 of FIG. 22 may include, for example, a menu of selectable program guide features 2202, one or more selectable advertisements 1304, cable operator and sponsor logo graphics 1306, the current time 1308, mail-available indicator 1310, and a login option 2206. A user may login by selecting login option 2206 or speaking a suitable voice command (e.g., "Login"). In response, the guide may provide the user with a login screen in which the user may enter or speak login information (e.g., a user-specified guide name and password).

A user may set up or personalize the guide by selecting setup option 2204. In response, the guide may display setup screen 2300 of FIG. 23. Screen 2300 may contain a menu of selectable setup options 2302, one or more selectable advertisements 1304, cable operator and sponsor brand logo 1306, the current time 1308, and a mail-available indicator 1310. The setup menu may include setup options, such as user account setup option 2304 and audio feature setup option 2306. The guide may provide the user with an opportunity to setup a user in response to a user selecting user account setup option 2304. The guide may provide selectable options for providing audio-based guidance features in response to a user selecting audio feature setup option 2306.

Figure 23:
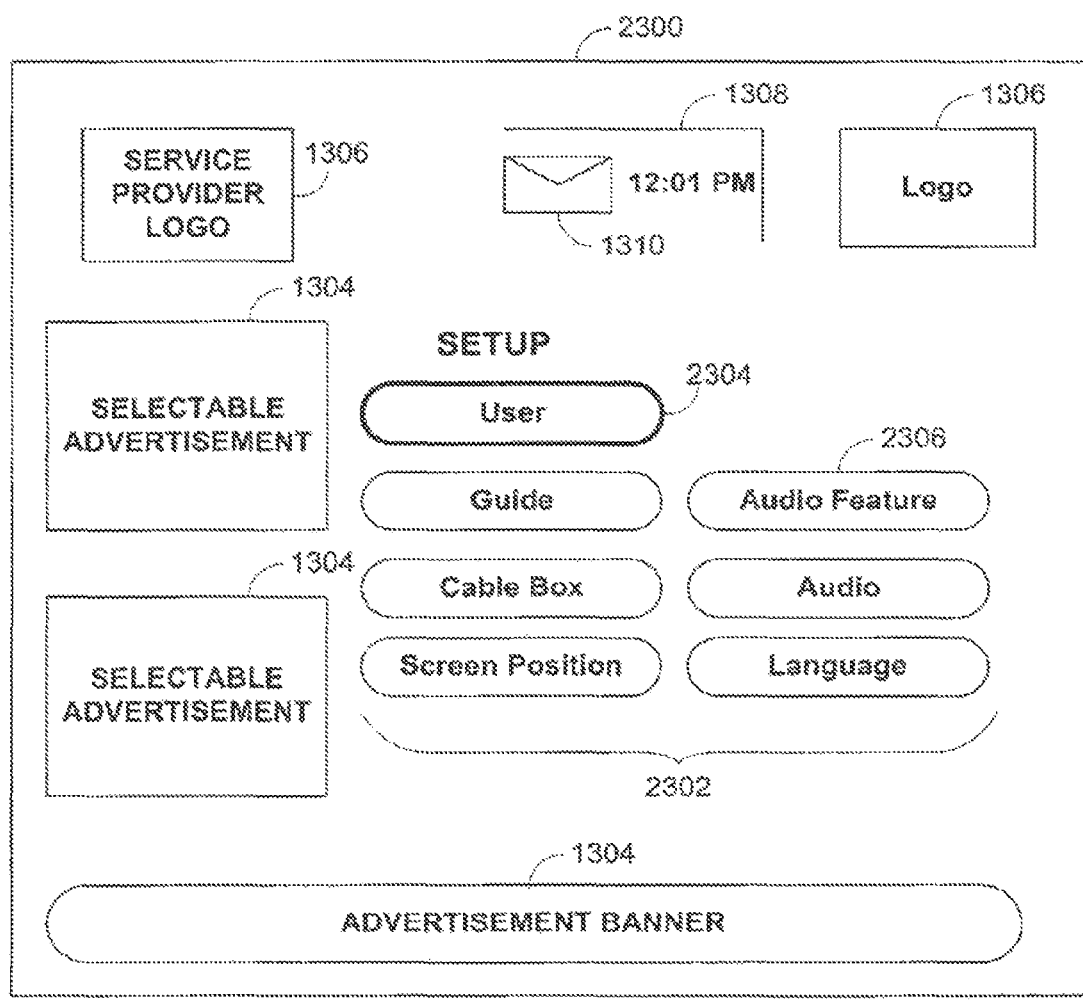
FIG. 23 is an illustrative interactive electronic television program guide setup display screen in accordance with one embodiment of the present invention.
Figure 24:
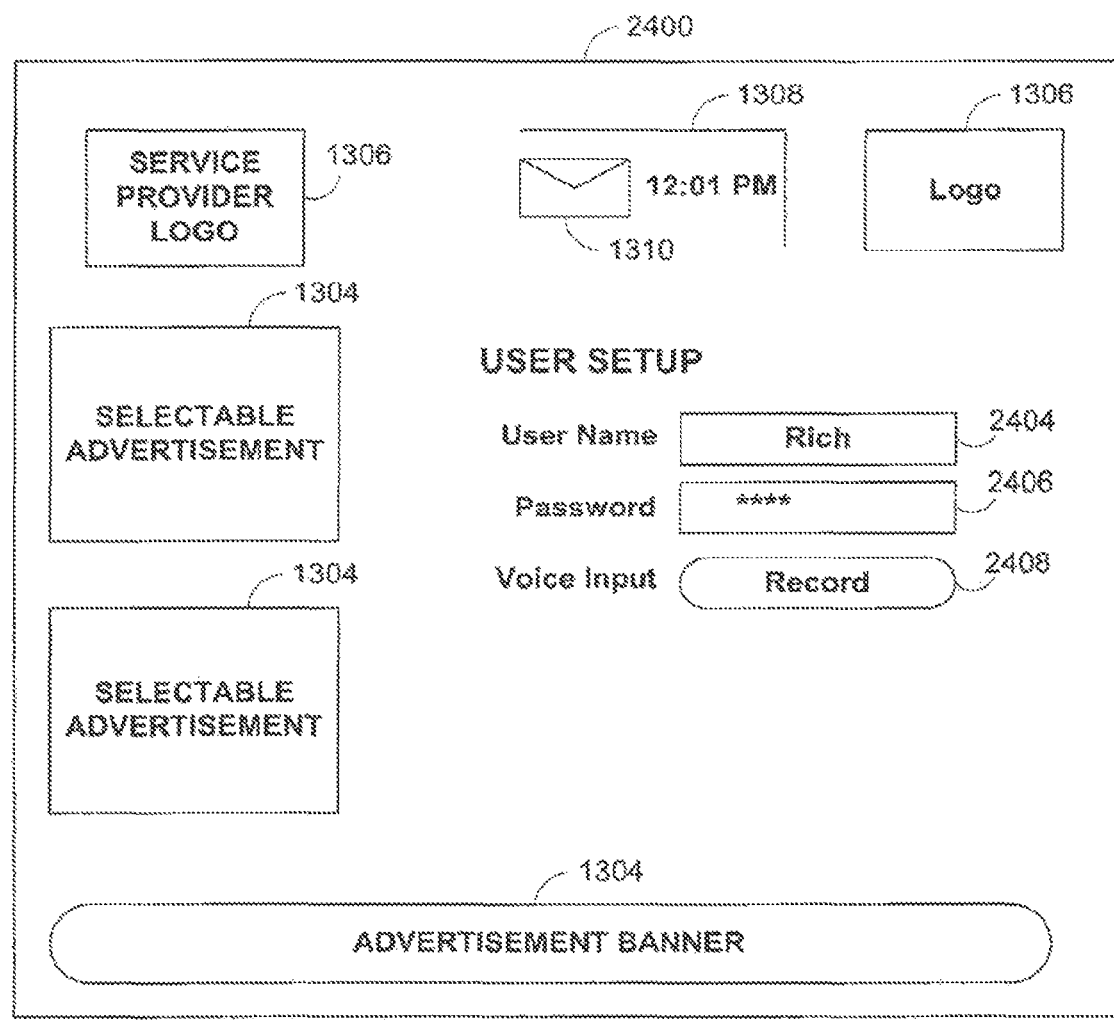
FIG. 24 is an illustrative interactive electronic television program guide user account setup display screen in accordance with one embodiment of the present invention.

FIG. 24 shows an illustrative user account setup screen 2400 in accordance with one embodiment of the present invention that the guide may display in response to a user selecting user account setup option 2304 (FIG. 23). User account setup screen 2400 may allow the user to set up the user's account. The user may enter a username in field 2404 and a password in field 2406. Alternatively, the user may setup an account using a voice input by selecting record option 2408. In response, the guide provides a time within which the user may speak the user's username and password. The guide may use the account to associate user preferences and other user settings with the user. For example, the guide may monitor and track user activity and save such information in the user's profile to provide targeted advertisements or provide product recommendations.

Figure 25:
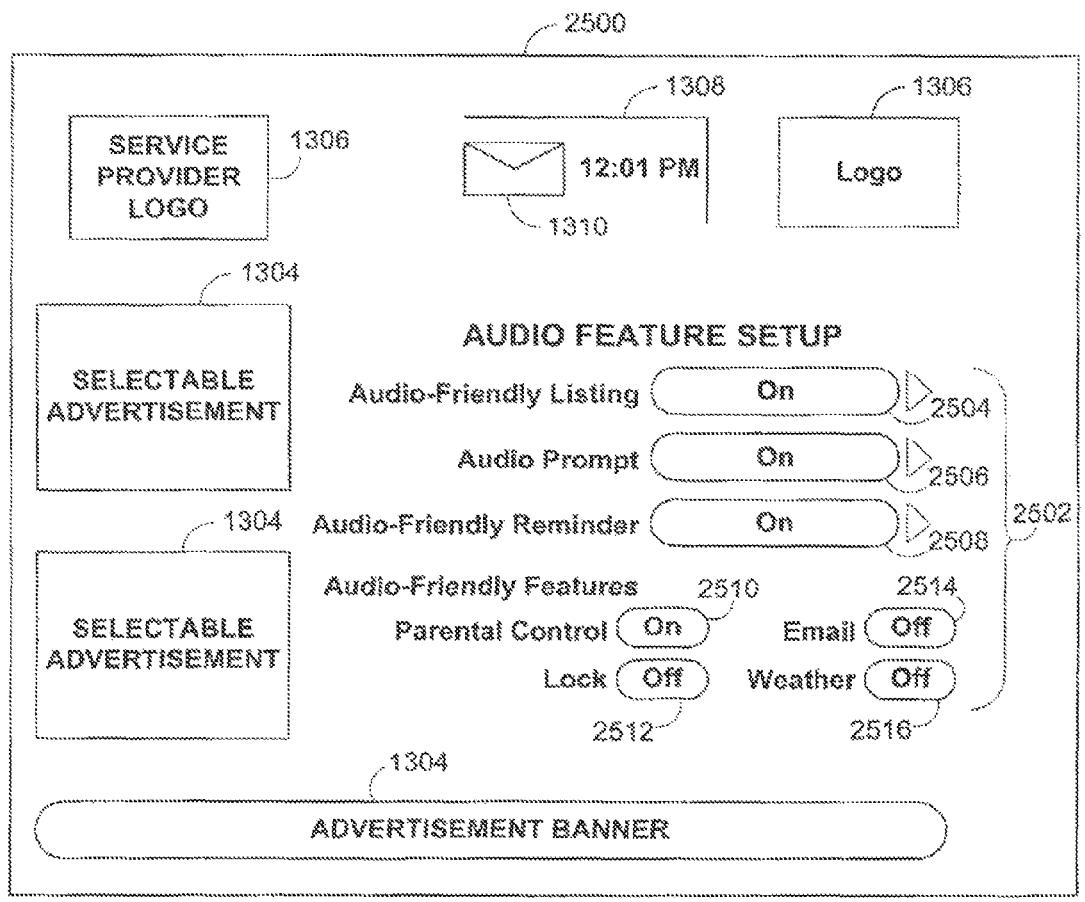
FIG. 25 is an illustrative interactive electronic television program guide audio feature setup display screen in accordance with one embodiment of the present invention.

FIG. 25 shows an illustrative audio feature setup screen 2500 in accordance with one embodiment of the present invention that may be displayed in response to a user selecting audio feature setup option 2306 from menu screen 2300 (FIG. 23). Audio feature setup screen 2500 may include audio feature setup options 2502 that allow the user to set various guide settings related to audio-based guidance features. The user may set audio-friendly listing option 2504 to "On" to set the guide to a mode in which only listings for audio-friendly content are provided. For example, when option 2504 is set to "On" the guide may provide listings displays having only listings for audio-friendly content, such as listings display 1400 of FIG. 14.

The user may set audio prompt option 2506 to "On" to activate an audio prompts feature. In response, the guide may provide audio prompts when available (e.g., from audio guide tracks, audio renditions, audio clips, audio streams, etc.). For example, when option 2506 is set to "On", the guide may read audio prompts for the listings in listings displays 1300 and 1400 of FIGS. 13 and 14, respectively, provide audio prompts for reminder overlay 1504 of FIG. 15, and provide audio prompts for weather display 1600 of FIG. 16.

The user may set audio-friendly reminder option 2508 to "On" to be provided with audio-friendly reminders. In response, the guide may provide reminders for all audio-friendly programs prior to their broadcast time. For example, when option 2508 is set to "On" the guide may provide audio friendly reminder overlay 1504 of FIG. 15 at a predefined time prior to when the programs in overlay 1504 are available.

The user may identify some electronic television program guide features as audio-friendly to be provided with audio prompts whenever information related to these features is displayed. In audio feature setup screen 2500 a user may set feature options such as, for example, parental control option 2510, lock option 2512, email option 2514, and weather option 2516, to "On" to be provided with audio prompts whenever information related to these features is displayed. For example, when parental control option 2510 is set to "On", the guide may provide audio prompts whenever parent control related information such as, for example, locked program, parent login, or any other parental control related information, is displayed.

Figure 26:
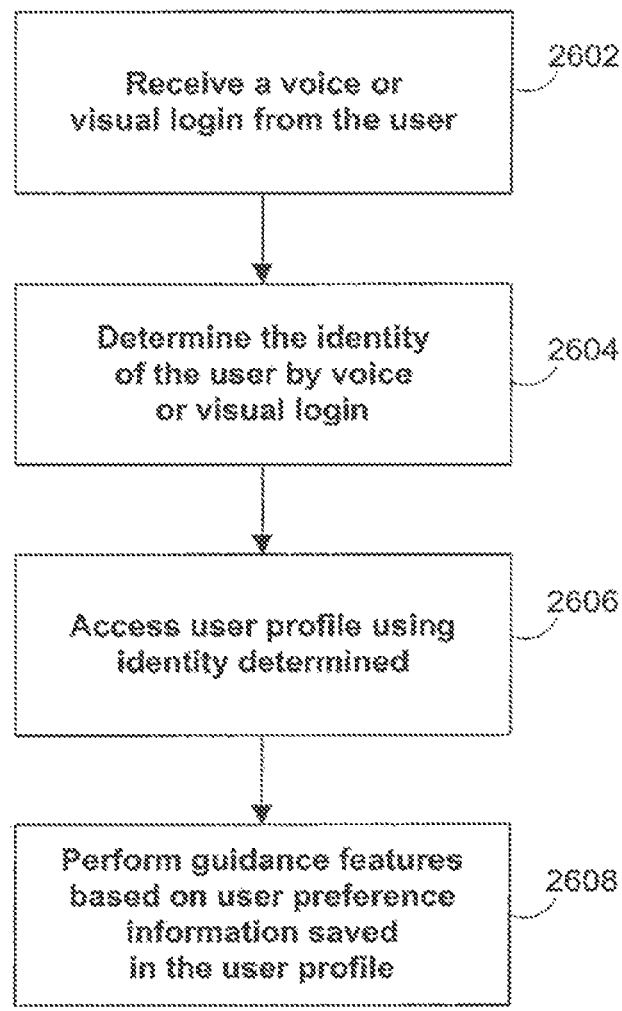
FIG. 26 is a flowchart of illustrative steps involved in performing personalized guidance features in accordance with one embodiment of the present invention.

FIG. 26 shows a flowchart of illustrative steps involved in performing personalized guidance features for the user in accordance with one embodiment of the present invention. At step 2602, a voice login or visual login may be received from the user. For example, a voice login (e.g., voice input of a user-specified guide name) may be received from a microphone. At step 2604, the identity of the user may be determined through voice or visual login. For example, a voice recognition system, such as voice recognition system 1020 (FIG. 10) may determine a user's identity from a voice login by comparing the voice login to saved voice profiles. As another example, a user's identity may be determined based on a visual login by comparing the visual login to login information saved in user profiles. At step 2606, the identity of the user may be used to access the user's profile. At step 2608, the guide performs guidance features (e.g., customizes guide interfaces, provides audio-friendly indicators, provides audio prompts, provides targeted advertisements, provides favorites, provides reminders, provide user-identified audio-friendly features, or any other suitable feature) based on user preference information stored in the user profile.

Thus, systems and methods for providing audio-based guidance features are provided. One skilled in the art will appreciate that the present invention can be practiced by other than the described embodiments, which are presented for purposes of illustration and not of limitation, and the present invention is limited only by the claims which follow.

What is claimed is:

1. A method for providing audio-based guidance in a media guide, the method comprising:
receiving a plurality of listings, wherein each of the plurality of listings is associated with a respective media item of a plurality of media items, the plurality of media items including a first media item having audio-friendly characteristics that make media content desirable to users who have difficulties viewing or understanding a visual portion of the content, the plurality of media items including a second media item not having the audio-friendly characteristics;
generating for display the plurality of listings;
receiving a first user command to navigate to a listing associated with the first media item;
automatically determining that the first media item has the audio-friendly characteristics; and
playing an audio notification when the first media item is determined to have the audio-friendly characteristics.

2. The method of claim 1 further comprising generating for display a graphical indicator that indicates that the first media item has the audio-friendly characteristics.

3. The method of claim 1, wherein the first user command is a voice command.

4. The method of claim 1, wherein the plurality of media items comprises television-based programs and the audio-friendly characteristics comprise audio tracks that describe the visual portion of the content.

5. The method of claim 1, wherein the plurality of media items comprises Internet-delivered content items and the audio-friendly characteristics comprise audio clips or streams that describe the visual portion of the content.

6. The method of claim 1, wherein the audio notification is a tone indicator or an audio prompt.

7. The method of claim 1 further comprising:
determining whether a user has enabled the media guide to provide the audio notification; and
providing the audio notification only when the user has enabled the media guide to provide the audio notification.

8. The method of claim 1 further comprising deactivating the audio notification in response to a second user command.

9. The method of claim 1 further comprising:
receiving a second user command to provide the audio notification at a reduced speed; and
providing the audio notification at the reduced speed, in response to receiving the second user command.

10. The method of claim 1 further comprising:
receiving a second user command to access the first media item; and
accessing the first media item in response to the second user command to access the first media item.

11. The method of claim 1, wherein automatically determining that the first media item has the audio-friendly characteristics includes identifying an audio-friendly characteristics tag from data associated with the first media item.

12. A system for providing audio-based guidance in a media guide, the system comprising control circuitry configured to:
receive a plurality of listings, wherein each of the plurality of listings is associated with a respective media item of a plurality of media items, the plurality of media items including a first media item having audio-friendly characteristics that make media content desirable to users who have difficulties viewing or understanding a visual portion of the content, the plurality of media items including a second media item not having the audio-friendly characteristics;
generate for display the plurality of listings;
receive a first user command to navigate to a listing associated with the first media item;
automatically determine that the first media item has the audio-friendly characteristics; and
play an audio notification when the first media item is determined to have the audio-friendly characteristics.

13. The system of claim 12, wherein the control circuitry is further configured to generate for display a graphical indicator that indicates that the first media item has the audio-friendly characteristics.

14. The system of claim 12, wherein the first user command is a voice command.

15. The system of claim 12, wherein the plurality of media items comprises television-based programs and the audio-friendly characteristics comprise audio tracks that describe the visual portion of the content.

16. The system of claim 12, wherein the plurality of media items comprises Internet-delivered content items and the audio-friendly characteristics comprise audio clips or streams that describe the visual portion of the content.

17. The system of claim 12, wherein the audio notification is a tone indicator or an audio prompt.

18. The system of claim 12, wherein the control circuitry is further configured to:
determine whether a user has enabled the media guide to provide the audio notification; and
provide the audio notification only when the user has enabled the media guide to provide the audio notification.

19. The system of claim 12, wherein the control circuitry is further configured to deactivate the audio notification in response to a second user command.

20. The system of claim 12, wherein the control circuitry is further configured to:
receive a second user command to provide the audio notification at a reduced speed; and
provide the audio notification at the reduced speed, in response to receiving the second user command.

21. The system of claim 12, wherein the control circuitry is further configured to:
receive a second user command to access the first media item; and
access the first media item in response to the second user command to access the first media item.

22. The system of claim 12, wherein the control circuitry is further configured to identify an audio-friendly characteristics tag from data associated with the first media item.

23. A method for providing audio-based guidance in a media guide, the method comprising:
receiving a plurality of listings, wherein each of the plurality of listings is associated with a respective media item of a plurality of media items, the plurality of media items including a first media item having audio-friendly characteristics that make media content desirable to users who have difficulties viewing or understanding a visual portion of the content, the plurality of media items including a second media item not having the audio-friendly characteristics;
generating for display the plurality of listings;
receiving a first user command to navigate to a listing associated with the first media item;
receiving a second user command to obtain additional information associated with the first media item;
automatically determining that the first media item has the audio-friendly characteristics; and
in response to receiving the second user command, playing an audio notification when the first media item is determined to have the audio-friendly characteristics.

24. The method of claim 23 further comprising generating for display a graphical indicator that indicates that the first media item has the audio-friendly characteristics.

25. The method of claim 23, wherein the first and second user commands are voice commands.

26. The method of claim 23, wherein the plurality of media items comprises television-based programs and the audio-friendly characteristics comprise audio tracks that describe the visual portion of the content.

27. The method of claim 23, wherein the plurality of media items comprises Internet-delivered content items and the audio-friendly characteristics comprise audio clips or streams that describe the visual portion of the content.

28. The method of claim 23, wherein the audio notification is a tone indicator or an audio prompt.

29. The method of claim 23 further comprising:
determining whether a user has enabled the media guide to provide the audio notification; and
providing the audio notification only when the user has enabled the media guide to provide the audio notification.

30. The method of claim 23 further comprising deactivating the audio notification in response to a third user command.

31. The method of claim 23 further comprising:
receiving a third user command to provide the audio notification at a reduced speed; and
providing the audio notification at the reduced speed, in response to receiving the third user command.

32. The method of claim 23 further comprising:
receiving a third user command to access the first media item; and
accessing the first media item in response to the third user command to access the first media item.

33. The method of claim 23, wherein automatically determining that the first media item has the audio-friendly characteristics includes identifying an audio-friendly characteristics tag from data associated with the first media item.

34. A system for providing audio-based guidance in a media guide, the system comprising control circuitry configured to:
receive a plurality of listings, wherein each of the plurality of listings is associated with a respective media item of a plurality of media items, the plurality of media items including a first media item having audio-friendly characteristics that make media content desirable to users who have difficulties viewing or understanding a visual portion of the content, the plurality of media items including a second media item not having the audio-friendly characteristics;

generate for display the plurality of listings;

receive a first user command to navigate to a listing associated with the first media item;

receive a second user command to obtain additional information associated with the first media item;

automatically determine that the first media item has the audio-friendly characteristics; and in response to receiving the second user command, play an audio notification when the first media item is determined to have the audio-friendly characteristics.

35. The system of claim 34, wherein the control circuitry is further configured to generate for display a graphical indicator that indicates that the first media item has the audio-friendly characteristics.

36. The system of claim 34, wherein the first and second user commands are voice commands.

37. The system of claim 34, wherein the plurality of media items comprises television-based programs and the audio-friendly characteristics comprise audio tracks that describe the visual portion of the content.

38. The system of claim 34, wherein the plurality of media items comprises Internet-delivered content items and the audio-friendly characteristics comprise audio clips or streams that describe the visual portion of the content.

39. The system of claim 34, wherein the audio notification is a tone indicator or an audio prompt.

40. The system of claim 34, wherein the control circuitry is further configured to:

determine whether a user has enabled the media guide to provide the audio notification; and provide the audio notification only when the user has enabled the media guide to provide the audio notification.

41. The system of claim 34, wherein the control circuitry is further configured to deactivate the audio notification in response to a third user command.

42. The system of claim 34, wherein the control circuitry is further configured to:

receive a third user command to provide the audio notification at a reduced speed; and provide the audio notification at the reduced speed, in response to receiving the third user command.

43. The system of claim 34, wherein the control circuitry is further configured to:

receive a third user command to access the first media item; and access the first media item in response to the third user command to access the first media item.

44. The system of claim 34, wherein the control circuitry is further configured to identify an audio-friendly characteristics tag from data associated with the first media item.

* * * * *